US012656762B2

(12) United States Patent
Antony et al.

(10) Patent No.: US 12,656,762 B2
(45) Date of Patent: Jun. 16, 2026

(54) METHOD AND SYSTEM FOR SEAMLESS TRANSITION OF RUNTIME SYSTEM FROM CONTROLLER DEVICE TO DIGITALIZATION PLATFORM

(71) Applicant: Siemens Aktiengesellschaft, Munich (DE)

(72) Inventors: Elvis Antony, Nuremberg (DE); Srivathsa Simha Oruganti, Bangalore (IN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 498 days.

(21) Appl. No.: 18/135,235

(22) Filed: Apr. 17, 2023

(65) Prior Publication Data
US 2023/0350392 A1 Nov. 2, 2023

(30) Foreign Application Priority Data
Apr. 29, 2022 (EP) .................................... 22170746

(51) Int. Cl.
*G05B 19/41* (2006.01)
*G05B 19/418* (2006.01)

(52) U.S. Cl.
CPC ..... *G05B 19/4185* (2013.01); *G05B 19/4184* (2013.01)

(58) Field of Classification Search
CPC ............ G05B 19/4185; G05B 19/4184; G05B 23/0297; G05B 19/0428; G05B 19/41865;
(Continued)

(56) References Cited

U.S. PATENT DOCUMENTS

| | | | |
|---|---|---|---|
| 2007/0177524 A1 | 8/2007 | Qian | |
| 2017/0017221 A1* | 1/2017 | Lamparter | ........... G05B 19/056 |

(Continued)

FOREIGN PATENT DOCUMENTS

| | | |
|---|---|---|
| EP | 3835943 A1 | 6/2021 |
| EP | 3961337 A1 | 3/2022 |

(Continued)

OTHER PUBLICATIONS

Fan Ming et al:"android malware detection : a survey", scientia sinica informationis vlume 50, issue 8: 1148-1177, Aug. 31, 2020.

*Primary Examiner* — Christopher W Carter
(74) *Attorney, Agent, or Firm* — Schmeiser, Olsen & Watts LLP

(57) ABSTRACT

A method and system for seamless transition of a runtime system from a controller device to a digitalization platform is provided. The method further includes simulating, by the processing unit, when a connectivity error is determined to present, a second input parameter value based on an analysis of the generated input-output knowledge graph. The second input parameter value is a parameter value to be received from the plurality of sensor devices during execution of the engineering program. The method further includes transmitting, by the processing unit, the generated at least one output parameter value to a plurality of industrial devices in the technical installation, to control the at least the plurality of industrial devices.

13 Claims, 20 Drawing Sheets

(58) Field of Classification Search
CPC .......... G05B 2219/32252; G05B 23/02; G05B
19/418; G06N 5/02; G06N 5/022; G06F
11/3006; G06F 11/3457
See application file for complete search history.

(56) References Cited

U.S. PATENT DOCUMENTS

| | | | |
|---|---|---|---|
| 2019/0068618 A1* | 2/2019 | Mestha | H04L 63/1466 |
| 2019/0121801 A1* | 4/2019 | Jethwa | G06F 16/243 |
| 2019/0230106 A1 | 7/2019 | Abbaszadeh | |
| 2020/0201875 A1* | 6/2020 | Wu | G06F 16/9024 |
| 2020/0334402 A1 | 10/2020 | Grefen | |
| 2021/0110075 A1 | 4/2021 | Dalloro et al. | |
| 2022/0102011 A1 | 3/2022 | Stroh et al. | |
| 2022/0164660 A1 | 5/2022 | Fietzek | |
| 2023/0325229 A1 | 10/2023 | Nakaide | |

FOREIGN PATENT DOCUMENTS

| | | | |
|---|---|---|---|
| JP | 2020177672 A | 10/2020 | |
| KR | 20190128717 A | 11/2019 | |
| WO | 2021028322 A1 | 2/2021 | |
| WO | 2022085651 A1 | 4/2022 | |

* cited by examiner

400

400

500

METHOD AND SYSTEM FOR SEAMLESS TRANSITION OF RUNTIME SYSTEM FROM CONTROLLER DEVICE TO DIGITALIZATION PLATFORM

CROSS-REFERENCE TO RELATED APPLICATIONS

This application claims priority to EP Application No. 22170746.6, having a filing date of Apr. 29, 2022, the entire contents of which are hereby incorporated by reference.

FIELD OF TECHNOLOGY

The following relates to a field of engineering of computer assisted programming, and more particularly relates to a method and system for seamlessly transitioning a runtime system from a controller device to a digitalization platform.

BACKGROUND

A technical installation such as an industrial plant comprises plurality of industrial devices which are controlled by a controller device such as a programmable logical controller. Examples of the plurality of industrial devices includes but is not limited to, control valves, motors, pumps, and actuators. The controller device is further configured to receive real-time inputs from a plurality of sensor devices in the industrial plant. The controller device processes the received real-time inputs to control the plurality of industrial devices. The received real-time inputs are processed by execution of an engineering program in the controller device.

With the advent of digitalization based computing technologies, it may be beneficial to run the engineering program in a digital twin of the controller device, which is hosted in a digitalization platform. In such a case, the digitalization platform receives the real-time inputs and controls the plurality of industrial devices based on the received real-time inputs.

Running the engineering programs in the digitalization platform has several disadvantages. For example, efficient functioning of the industrial plant requires timely input of the real-time inputs into the digitalization platform. If the real-time inputs are not fed into the digitalization platform timely, the execution of the engineering program shall be affected, resulting in downtime. Thus, presence of connectivity errors in a network connection between the plurality of sensor devices and the digitalization platform, could hamper efficient functioning of the industrial plant. Furthermore, if the digitlaization platform does not accurately simulate a behaviour of the controller device, the real-time inputs may be processed incorrectly. In such a case, functioning of the industrial plant is hampered.

Furthermore, transitioning a runtime of an engineering system from the controller device to the digitalization platform may be expensive. For example: in order for the digitalization platform to accurately simulate the behaviour, the digitalization platform has to be generated based on an analysis of a vast number of input signals and output signals of the controller device. Thus, generation of the digitalization platform takes a gigantic amount of time and effort. As a result, an attempt to transition a runtime system from the controller device to the digitalization platform may be a time and labour intensive process.

Thus, it is expensive, laboursome, and difficult to transition an existing automation system from the PLC based platform to the digitalization platform.

SUMMARY

An aspect relates to an efficient and cost effective method and system for seamlessly transitioning a runtime system from a PLC based platform to a digitalization platform. Therefore, it is an aspect of the present invention to provide a method and system for seamless transition of a runtime system from a controller device to a digitalization platform.

The aspect of the invention is achieved by a method and system for seamlessly transitioning a runtime system from a controller device to a digitalization platform. Examples of the controller device comprises a programmable logical controller (PLC) or a microprocessor or a processing unit. The digitalization platform comprises configurable computing physical and logical resources, for example, networks, servers, storage, applications, services, etc., and data distributed over a platform, such as cloud computing platform. The controller device and the digitalization platform is configured to execute an engineering program to control a plurality of industrial devices in a technical installation. Examples of the plurality of industrial devices include, but is not limited to control valves, motors, pumps, robots, lathes and actuators. Examples of the technical installation includes a manufacturing plant, a power plant, or a chemical processing plant.

The engineering program comprises a plurality of programming blocks, each of which comprises one or more programmatic instructions. In one example, the engineering program is a graphical program comprising a program logic. The engineering program comprises a set of programmable instructions or statements corresponding to the program logic. Each programming block of the plurality of programming blocks corresponds to a function block under an engineering design of the technical installation. The engineering design may comprise several such programming blocks. The controller device is configured to execute the engineering program in a plurality of scan cycles. The controller device and the digitalization platform is further communicatively coupled to a plurality of sensor devices and a plurality of human machine interfaces. The plurality of sensor devices comprises a pressure sensor, a temperature sensor and a vibration sensor. Examples of the human machine interfaces includes, but is not limited to keyboards, mouses, and touchscreens. The plurality of human machine interfaces further comprise a plurality of client devices such as a smartphone, a desktop computer, and a tablet computer which are network connected to the controller device or the digitalization platform.

In an embodiment, the method comprises capturing, by the processing unit, a plurality of input-output parameter values transmitted or received by the controller device during a plurality of scan cycles of the execution of the engineering program. The plurality of input-output parameter values comprises a plurality of input parameter values and a plurality of output parameter values. Examples of the plurality of input parameter values comprises parameter values received by the controller device from a plurality of sensor devices and a plurality of human machine interfaces.

Thus, the captured plurality of input-output parameter values comprises sensor data, user commands, and user inputs. In one example, the plurality of input-output parameter values further comprises information about a plurality of user actions that a user has performed on a human machine interface of the plurality of human machine interfaces connected to the controller device. In another example, the plurality of input-output parameter values comprises a plurality of input parameters received by the controller device, from the plurality of sensor devices. The plurality of input-output parameter values further comprises the plurality of output parameter values generated by the controller device, in response to reception of the plurality of user actions. The plurality of output parameter values comprises parameter values transmitted by the controller device or the digitalization platform into the plurality of industrial devices in the technical installation.

In an embodiment, the method further comprises analyzing, by the processing unit, the captured plurality of input-output parameter values. The processing unit is configured to identify a plurality of patterns in the plurality of input-output parameter values based on the analysis. Furthermore, the processing unit is further configured to identify a plurality of relationships between parameter values in the captured plurality of input-output parameter values.

In an embodiment, the method further comprises generating, by the processing unit, an input knowledge graph, an output knowledge graph, and an input-output correspondence knowledge graph based on the analysis of the captured plurality of input-output parameter values. The input knowledge graph comprises information about the plurality of relationships between the plurality of input parameter values in the captured plurality of input-output parameter values. The processing unit is configured to query the input knowledge graph to predict parameter values which are likely to be received by the controller device during a future scan cycle of the execution of the engineering program. The future scan cycle occurs subsequent to the plurality of scan cycles in which the plurality of input-output parameter values are captured.

The output knowledge graph comprises information about the plurality of relationships between the plurality of output parameter values which are transmitted by the controller device. The processing unit is configured to query the output knowledge graph to predict output parameter values which are likely to be transmitted by the controller device at the future scan cycle of execution of the engineering program in the controller device. The input-output correspondence knowledge graph comprises information about relationships between the each of the plurality of input parameter values and each of the plurality of output parameter values. The processing unit is configured to query the input output correspondence knowledge graph to predict an output parameter value which is likely to be transmitted by the controller device for a given input parameter value received by the controller device. In an embodiment, the method is further configured to generate an input-output knowledge graph based on the input knowledge graph, the output knowledge graph, and the input-output knowledge graph. In one example, the input-output knowledge graph is a three dimensional knowledge graph in which the input knowledge graph, the output knowledge graph and the input-output knowledge graph are represented as orthogonal dimensions in the three dimensional knowledge graph.

In an embodiment, the method further comprises receiving, by the processing unit, a plurality of network connection parameters associated with a network connection between the plurality of sensor devices and one of the controller device or the digitalization platform. The plurality of network connection parameters comprises information associated with network strength, packet count, packet drop data, associated with the network connection between the plurality of sensor devices and one of the controller device or the digitalization platform. In an embodiment, the method further comprises analyzing, by the processing unit, the plurality of network connection parameters. In an embodiment, the method further comprises determining, by the processing unit, the at least one connectivity error is present in the network connection based on the analysis. In one example, the plurality of network connectivity parameters comprises a network strength. In such a case, the processing unit is configured to determine whether the network strength drops below a predefined threshold. In a case where the network strength is determined to drop below the predefined threshold, the at least one connectivity error is determined to be present in the network connection between the plurality of sensor devices/the plurality of human machine interfaces and one of the controller device or the digitalization platform.

In a case where the at least one connectivity error is determined to be present in the network connection, the method further comprises simulating a first input parameter value based on an analysis of the generated input-output knowledge graph. In one example, the first input parameter value is simulated by the processing unit by querying the input-output knowledge graph. It has been noted that the input-output knowledge graph comprises information about the plurality of relationships between the plurality of input parameter values received by the controller device in the plurality of scan cycles. Thus, simulation of the first input parameter value, takes into account of the plurality of input parameter values received by the controller device in the plurality of scan cycles. Thus, the simulated first input parameter value is very likely to be received by the controller device from the plurality of sensor devices/the plurality of human machine interfaces during execution of the engineering program.

In a case where the at least one connection error is determined to be absent, the processing unit is configured to receive a second input parameter value from the plurality of sensor devices. The second input parameter value is received via the network connection. Examples of the second input parameter value comprises sensor data received from the plurality of sensor devices and a plurality of user inputs received from a human machine interface.

In an embodiment, the method further comprises determining, by the processing unit, whether information about one of the simulated first input parameter value or the received second input parameter value is present in the input-output knowledge graph. In other words, the processing unit is configured to determine whether the input-output knowledge graph comprises information about the plurality of relationships between the plurality of input-output parameter values and the first input parameter value or the second input parameter value. In a case where the input-output knowledge graph comprises information about the the first input parameter value or the second input parameter value, the processing unit is configured to query the input-output knowledge graph to generate at least one output parameter value.

The at least one output parameter value is the parameter value which is likely to be generated by the controller device, upon reception and processing of the first input parameter value or the second input parameter value in the controller device. The at least one output parameter value is simulated based on analysis the plurality of input-output parameter values received by the controller device during execution of the engineering program. Furthermore, the at least one output parameter value is simulated based on an analysis of information associated with the plurality of relationships between parameter values in the captured plurality of input-output parameter values. Thus, the processing unit is enabled to accurately simulate the at least one output parameter value with accuracy. Thus, generation of the at least one output parameter value is performed in the digitalization platform rather than the controller device.

Thus, processing power spent for processing the first parameter value or the second parameter value is taken up by the digitalization platform, rather than the controller device. Thus, a processing load of the controller device is reduced. As a result, a processing capacity of the controller device is increased. Furthermore, the controller device and the digitalization platform continues receiving the first input parameter value or the second input parameter value despite a presence of the at least one connection error in the network connection. Thus, execution of the engineering program is not halted even if at least one connection error is present in the network connection.

In an embodiment, the method further comprises determining, by the processing unit, whether one of the first input parameter value or the second input parameter value is a critical data item. In one example, one of the first input parameter value or the second input parameter value is determined to be the critical data item based on an application of an artificial intelligence model on the first input parameter value and the second input parameter value. In a case where it is determined that the first parameter value or the second parameter value is a critical data item, the first input parameter value or the second input parameter value is processed in the controller device.

In a case where it is determined that information about the first parameter value or the second parameter value is absent in the input-output knowledge graph, the method comprises transmitting, by the processing unit, the first parameter value or the second parameter value to the controller device. The controller device is configured to process the first parameter value or the second parameter value based on the execution of the engineering program. Further, the controller device is configured to generate the at least one output parameter value from the first parameter value or the second parameter value by the execution of the engineering program.

In an embodiment, the method further comprises receiving, by the processing unit, the generated at least one output parameter value from the controller device. In an embodiment, the method further comprises transmitting the generated at least one output parameter value to the plurality of industrial devices in the technical installation to control the plurality of industrial devices and run the technical installation efficiently. Thus, the controller device only has to process those parameter values which are not present in the input-output knowledge graph. Thus, processing load of the controller device is reduced significantly and majority of parameter value processing occurs in the digitalization platform. Thus, generation of the at least one output parameter value is performed in the digitalization platform. Thus, processing power spent for processing the first parameter value or the second parameter value is taken up by the digitalization platform, rather than the controller device. Thus, a processing load of the controller device is reduced.

In an embodiment, the method further comprises analyzing the generated at least one output parameter value. In an embodiment, the method further comprises modifying the input-output knowledge graph based on the analysis of the at least one output parameter value, the first input parameter value and the second input parameter value. The input-output knowledge graph is modified such that a relationship between the first input parameter value, the second parameter value and the at least one output parameter value is recorded in the input-output knowledge graph.

Thus, in a case where the controller device or the digitalization platform receives a parameter value equal to the first input parameter value or the second parameter value in the future, an output parameter value is readily generated by querying the input-output knowledge graph. Thus, the processing load of the controller device is further reduced. Eventually, the input-output knowledge graph accumulates information associated with all possible parameter values which can be received by the controller device. In such a case, the digitalization platform will be enabled to generate a plurality of output parameter value for all possible combinations of input parameter values received by the controller device. Thus, a runtime of the technical installation is seamless transitioned from the controller device into the digitalization platform.

In an embodiment, the method further comprises analyzing, by the processing unit, a plurality of programming blocks of the engineering program executed by the controller device. In an embodiment, the method further comprises determining, by the processing unit, a plurality of program execution parameters of the controller device. The plurality of program execution parameters comprise information about internal functioning of the controller device during execution of the engineering program. For example, the plurality of program execution parameters comprises runtime information such as information about memory fragmentation, scan cycle nature, system resource utilization, and memory utilization of the controller device during the execution of the engineering program in the controller device. In an embodiment, the method further comprises determining, by the processing unit, an efficiency of execution of the engineering program by the controller device.

In an embodiment, the method further comprises determining, by the processing unit, one or more programming blocks of the engineering program, which hamper effciency of the execution of the engineering program. In an embodiment, the method further comprises selecting, by the processing device, the one or more programming blocks to be transformed based on the determined efficiency of execution of the engineering program by the controller device. In an embodiment, the method further comprises applying, by the processing unit, an artificial intelligence model on the determined one or more programming block. The artificial intelligence model is trained to transform the determined one or more programming blocks to optimize the efficiency of execution of the engineering program by the controller device. In an embodiment, the method further comprises transforming, by the processing unit, the plurality of programming blocks based on the application of the artificial intelligence model on the engineering program. In an embodiment, the method further comprises moving, by the processing unit, the transformed plurality of programming blocks to the digitalization platform.

In an embodiment, a method of seamless transition of a runtime system from a controller device to a digitalization platform comprises receiving, by the processing unit, a first input-output knowledge graph comprising information about a plurality of relationships between a plurality of input-output parameter values which are transmitted or received by a controller device. The plurality of input-output parameter values comprises a plurality of input parameter values and a plurality of output parameter values. Examples of the plurality of input parameter values comprises parameter values received by the controller device from a plurality of a plurality of human machine interfaces. The pluralty of input parameter values comprises sensor data, user commands, and user inputs. In one example, the plurality of input parameter values comprises a plurality of user actions performed by a user on the plurality of human machine interfaces. Examples of the plurality of user actions comprises user commands, user inputs, programming instructions and user selections input by the user in an input device of the human machine interface. The plurality of output parameter values comprises parameter values transmitted by the controller device and the digitalization platform into the plurality of industrial devices in the technical installation. The plurality of output parameter values comprises control signals transmitted by the controller device based on the reception of the plurality of user actions. The user may input the plurality of user actions to perform a task using the executed engineering program. The plurality of user actions are arranged as workflows. The user is enabled to execute a workflow comprising a set of user actions to perform the task. In one example, the task can be performed using one of a first workflow and a second workflow.

In an embodiment, the method further comprises determining, by the processing unit, whether at least one connectivity error is present in a network connection between a plurality of human machine interfaces and one of the controller device or the digitalization platform. The at least one connectivity issue is determined based on an analysis of a plurality of network connection parameters associated with the network connection. In an embodiment, the method further comprises simulating, by the processing unit, when the connectivity error is determined to present, a first input parameter value based on an analysis of the modified input-output knowledge graph. The first input parameter value is a parameter value which is likely to be received from the plurality of human machine interfaces during execution of the engineering program. In one example, the first input parameter value comprises information about a user action which is likely to be received by the controller device during execution of the engineering program.

In an example, the method comprises receiving, by the processing unit, when it is determined that the connectivity error is absent in the network connection between the plurality of human machine interfaces and the controller device, a second input parameter value from the plurality of sensor devices. The second input parameter value is at least one of a control signal, a sensor data signal, and a user input from the first user. In an embodiment, the method further comprises determining, by the processing unit, whether one of the first and the second input parameter value is present in the first input output parameter value. In other words, the method comprises determining whether a relationship between one of the first and the second input parameter value with any of the plurality of input-output parameter values is recorded in the first input-output knowledge graph. If the information about at least one of the first and the second input parameter value is present in the first input-output knowledge graph, the processing unit is enabled to generate the at least one output parameter by simply querying the first input-output knowledge graph. In a case where the information about one of the first or the second input parameter value is absent in the first input-output knowledge graph, the method further comprises determining whether the information about the first or the second input parameter is present in a second input-output knowledge graph stored in the database.

In one example, in a case where it is determined that the information about the first or the second input parameter value is present in the second input-output knowledge graph, the method further comprises determining, by the processing unit, one or more knowledge graph instances within the second input-output knowledge graph. The one or more knowledge graph instances comprises information about the first or the second input parameter value. The one or more knowledge graph instances further comprises information about one or more parameter values which are likely to be received by the controller device, in a future scan cycle of execution of the engineering program.

In an embodiment, the method further comprises analyzing, by the processing unit, the first input-output knowledge graph to categorize a plurality of portions of the first input-output knowledge graph into an active section and a latent section. The active section comprises information about a first set of parameter values which are to be processed in a current scan cycle of execution of the engineering program. The latent section comprises information about a second set of parameter values which are to be processed in a future scan cycle of execution of the engineering program. In an embodiment, the method further comprises mapping, by the processing unit, the received one or more knowledge graph instances into one of the active section or the latent section of the first input-output knowledge graph. In an embodiment, the method further comprises appending, by the processing unit, the received one or more knowledge graphs into the first input-output knowledge graph based on a set of cognitive rules. Thus, the processing unit is configured to modify the first input-output knowledge graph based on the set of cognitive rules. The set of cognitive rules are a set of rules designed to transfer earnings from one knowledge graph to another.

In another example, the method comprises determining, by the processing unit, the first workflow comprising a first set of user actions to perform a task using the engineering program. In one example, the task is an engineering task which is performed via an engineering system. In another example, the task is a control task to control the plurality of industrial devices in the technical installation. The first set of user actions represents a first method of performing the task. The information associated with the first workflow is present in the first input-output knowledge graph. The information associated with the first workflow comprises information about a plurality of relationships between the first set of user actions in the first workflow. Furthermore, the first input-output knowledge graph comprises information about a sequence in which the first set of user actions are executed. In an embodiment, the method further comprises receiving, by the processing unit, a second workflow comprising a second set of user actions to perform the same task using the engineering program. The second set of user actions is different from the first set of user actions. In other words, the second set of user actions represents a second method of performing the same task using the engineering program. The information associated with the second workflow is present in a second input-output knowledge graph which is stored in a database. The second input-output knowledge graph comprises information about a sequence of user actions in the second workflow and also information about individual user actions in the second workflow.

In an embodiment, the method further comprises comparing the first input-output knowledge graph with the second input-output knowledge graph. In one example, the first input-output knowledge graph is compared with the second input-output knowledge graph based on a correlation operation between the two knowledge graphs. In an embodiment, the method further comprises determining, by the processing unit, a process efficiency of the first workflow and the second workflow based on the comparison. The process efficiency of each of the first and second workflows is an indicator of efficiency with which a respective workflow completes the task. In one example, the process efficiency of the first workflow and the second workflow is determined by measuring a time taken for task completion, when each of the first workflow and the second workflow are executed in the digital twin.

In an embodiment, the method further comprises determining, by the processing unit, whether the process efficiency of the second workflow is greater than the process efficiency of the first workflow. In a case where the process efficiency of the second workflow is greater than that of the first workflow, the method further comprises determining, by the processing unit, one or more knowledge graph instances in the second input-output knowledge graph which correspond to the second workflow. In an embodiment, the method further comprises receiving, by the processing unit, the determined one or more knowledge graph instances from the second input-output knowledge graph. In an embodiment, the method further comprises modifying the first input-output knowledge graph by appending the received one or more knowledge graph instances into the first input-output knowledge graph instances.

In an embodiment, the method further comprises generating, by the processing unit, at least one output parameter value from the simulated first input parameter value. In an embodiment, the method further comprises transmitting, by the processing unit, the generated at least one output parameter value to at least one device in the technical installation, to control the at least one device.

The aspect of embodiments of the present invention are also achieved by an engineering system for seamless transition of runtime system from controller device to a digitalization platform. The engineering system comprises one or more processor(s) and a memory coupled to the processing unit. The memory comprises data analytics and acquisition module stored in the form of machine-readable instructions executable by the processor. The data analytics and acquisition module is configured for performing the method as described above.

The aspect of embodiments of the present invention are also achieved by an industrial environment. The industrial environment comprising an engineering system, a technical installation comprising one or more physical components and a plurality of human machine interfaces communicatively coupled to the engineering system and the technical installation. The engineering system is configured to perform the above described method steps.

The aspect of embodiments of the present invention are also achieved by a computer-program product having machine-readable instructions stored therein, that when executed by one or more processor(s), cause the one or more processor(s) to perform method steps as described above.

The above-mentioned and other features of embodiments of the invention will now be addressed with reference to the accompanying drawings of embodiments of the present invention. The illustrated embodiments are intended to illustrate, but not limit the invention.

BRIEF DESCRIPTION

Some of the embodiments will be described in detail, with reference to the following figures, wherein like designations denote like members, wherein.

DETAILED DESCRIPTION

Figure 1:
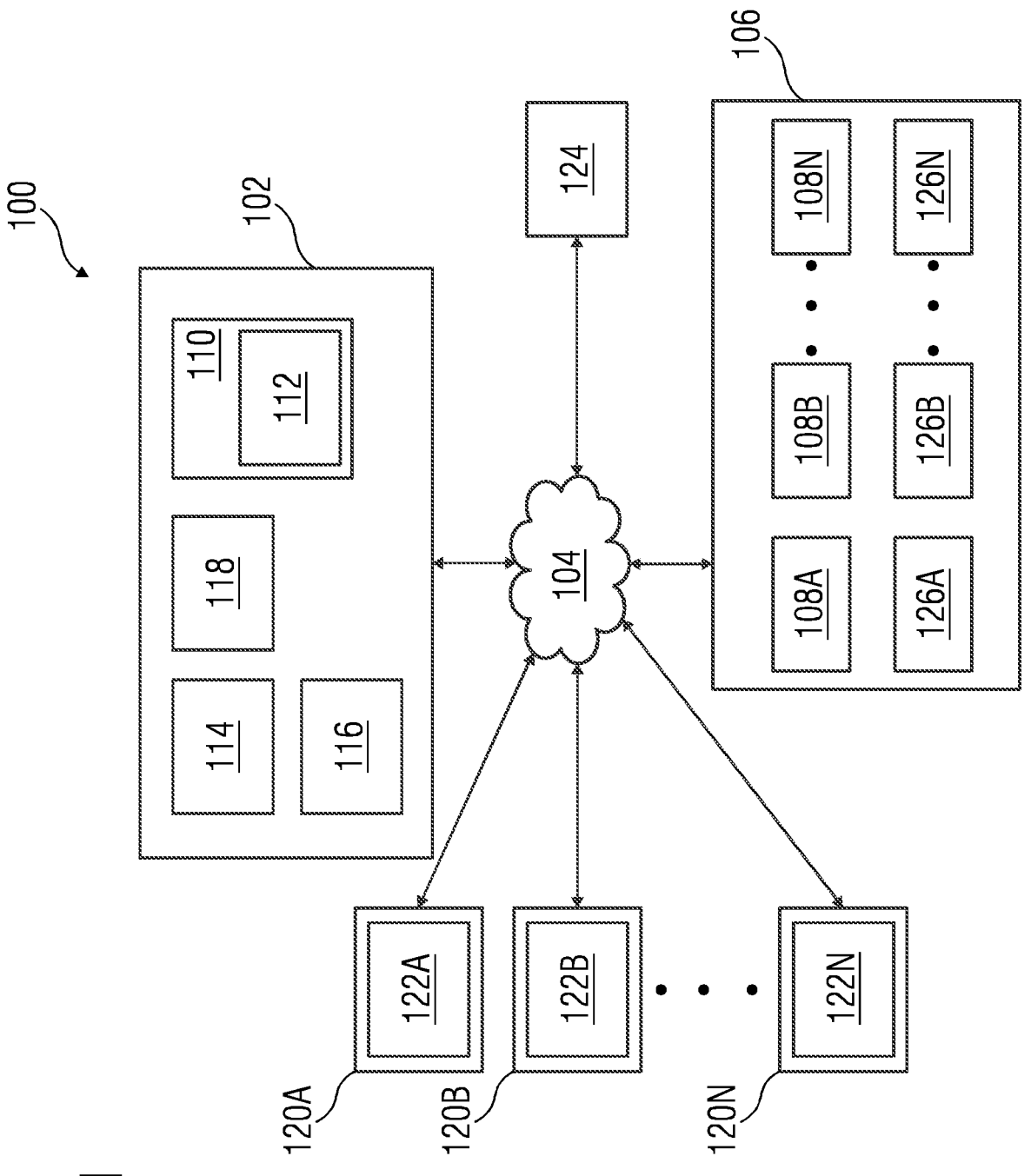
FIG. 1 is a block diagram of an industrial environment capable of transitioning a runtime system from a controller device to a digitalization platform, according to an embodiment of the present invention.

Various embodiments are described with reference to the drawings, wherein like reference numerals are used to refer the drawings, wherein like reference numerals are used to refer to like elements throughout. In the following description, for the purpose of explanation, numerous specific details are set forth in order to provide thorough understanding of one or more embodiments. It may be evident that such embodiments may be practiced without these specific details.

FIG. 1 is a block diagram of an industrial environment 100 capable of seamlessly transitioning a runtime system from a controller device 124 to a digitalization platform 110, according to an embodiment of the present invention. In FIG. 1, the industrial environment 100 includes an engineering system 102, a technical installation 106 and plurality of human machine interfaces 120A-N. As used herein, "industrial environment" refers to a processing environment comprising configurable computing physical and logical resources, for example, networks, servers, storage, applications, services, etc., and data distributed over a platform, such as cloud computing platform. The industrial environment 100 provides on-demand network access to a shared pool of the configurable computing physical and logical resources. The engineering system 102 is communicatively connected to the technical installation 106 via a network connection 104 (such as Local Area Network (LAN), Wide Area Network (WAN), Wi-Fi, Internet, any short range or wide range communication). The engineering system 102 is also connected to the plurality of human machine interfaces 120A-N via the network connection 104.

The engineering system 102 is connected to a plurality of industrial devices 108A-N in the technical installation 106 via the network connection 104. The the plurality of industrial devices 108A-N may include servers, robots, switches, automation devices, programmable logic controllers (PLC)s, human machine interfaces (HMIs), motors, valves, pumps, actuators, sensors and other industrial equipment(s). The plurality of industrial devices 108A-N may be connected to each other or several other components (not shown in FIG. 1) via physical connections. The physical connections may be through wiring between the plurality of industrial devices 108A-N. Alternatively, the plurality of industrial devices 108A-N may also be connected via non-physical connections (such as Internet of Things (IOT)) and 5G networks. Although, FIG. 1 illustrates the engineering system 102 connected to one technical installation 106, one skilled in the art can envision that the engineering system 102 can be connected to several technical installations located at different geographical locations via the network connection 104.

The technical installation 106 further comprises a plurality of sensor devices 126A-N. The plurality of sensor devices 126A-N comprises sensors such as a pressure sensor, a voltage sensor, a temperature sensor, and a vibration sensor. The plurality of sensor devices 126A-N take one or more measurements from the technical installation 106. The one or more measurements comprises a temperature measurement, a pressure measurement, and a vibration measutrment. The plurality of sensor devices 126A-N are connected to a controller device 124 via the network connection 104.

The plurality of human machine interfaces 120A-N may be a desktop computer, laptop computer, tablet, smart phone and the like. Each of the plurality of human machine interfaces 120A-N is provided with an engineering tool 122A-N for generating and/or editing engineering programs respectively. The plurality of human machine interfaces 120A-N can access the engineering system 102 for automatically generating engineering programs. The plurality of human machine interfaces 120A-N can access cloud applications (such as providing performance visualization of the plurality of industrial devices 108A-N via a web browser). Throughout the specification, the terms "human machine interface", "client device" and "user device" are used interchangeably. The plurality of human machine interfaces 120A-N are further configured to receive a plurality of user actions from a plurality of users. The plurality of user actions comprises user inputs, user commands, user gestures, programming instructions, and user passwords. The plurality of user actions are entered by the plurality of users to perform one or more tasks using the controller device 124 and the plurality of industrial devices 108A-N.

It is noted that the engineering system 102 is connected to the controller device 124. Examples of the controller device 124 comprises, but is not limited to programmable logic controllers, microprocessors, and other processing units. The controller device 124 is configured to execute the engineering program generated by the engineering system 102, in a plurality of scan cycles. The controller device 124 is configured to receive a plurality of input parameter values from the plurality of sensor devices 126A-N and the plurality of human machine interfaces 120A-N. The controller device 124 is further configured to transmit a plurality of output parameter values to the plurality of industrial devices 108A-N and the plurality of human machine interfaces.

The engineering system 102 may be a standalone server deployed at a control station or may be a remote server on a cloud computing platform. In an embodiment, the engineering system 102 may be a cloud-based engineering system. The engineering system 102 is capable of delivering applications (such as cloud applications) for managing a technical installation 106 comprising plurality of industrial devices 108A-N. The engineering system 102 may comprise a digitalization platform 110 (such as a cloud computing platform), a data acquisition and analytics module 112, a server 114 including hardware resources and an operating system (OS), a network interface 116 and a database 118. The digitalization platform 110 further comprises an input-output knowledge graph. The input-output knowledge graph comprises information about a plurality of relationships between a plurality of parameter values either received or transmitted by the controller device 124 during a time interval. The network interface 116 enables communication between the engineering system 102, the technical installation 106, the client device(s) 120A-N, the digitalization platform 110 and the controller device 124. The interface (such as cloud interface)(not shown in FIG. 1) may allow the engineers at the plurality of industrial devices 120A-N to access the controller device 124 and the digitalization platform 110 and execute a plurality of user actions on the controller device 124 and the digitalization platform 110.

The server 114 may include one or more servers on which the OS is installed. The servers 114 may comprise one or more processors, one or more storage devices, such as, memory units, for storing data and machine-readable instructions for example, applications and application programming interfaces (APIs), and other peripherals required for providing computing (such as cloud computing) functionality. In one example, the digitalization platform 110 may be implemented in the server 114. The digitalization platform 110 enables functionalities such as data reception, data processing, data rendering, data communication, etc. using the hardware resources and the OS of the servers 114 and delivers the aforementioned services using the application programming interfaces deployed therein. The digitalization platform 110 may comprise a combination of dedicated hardware and software built on top of the hardware and the OS. In an exemplary embodiment, the digitalization platform 110 may correspond to an Integrated Development Environment (IDE) comprising program editors and compilers which allow the users of the plurality of human machine interfaces 120A-N to generate engineering programs. The digitalization platform 110 may further comprise the data acquisition and analytics module 112 configured for enabling seamless transition of a runtime system from the controller device 124 to the digitalization platform 110. In one example, the data acquisition and analytics module 112 comprises a digital twin of the controller device 124. Details of the data acquisition and analytics module 112 is explained in FIG. 3.

The database 118 stores the information relating to the technical installation 106 and the the plurality of human machine interfaces 120A-N. The database 118 is, for example, a structured query language (SQL) data store or a not only SQL (NoSQL) data store. In an exemplary embodiment, the database 118 may be configured as cloud-based database implemented in the industrial environment 100, where computing resources are delivered as a service over the platform 110. The database 118, according to another embodiment of the present invention, is a location on a file system directly accessible by the data acquisition and analytics module 112. The database 118 is configured to store engineering project files, engineering programs, object behavior model, parameter values associated with the plurality of industrial devices 108A-N, test results, simulation results, status messages, one or more simulation instances, graphical programs, program logics, program logic patterns, of the plurality of industrial devices 108A-N and engineering object properties, one or more engineering object blocks, relationship information between the plurality of industrial devices 108A-N, requirements, program update messages and the like.

Figure 2:
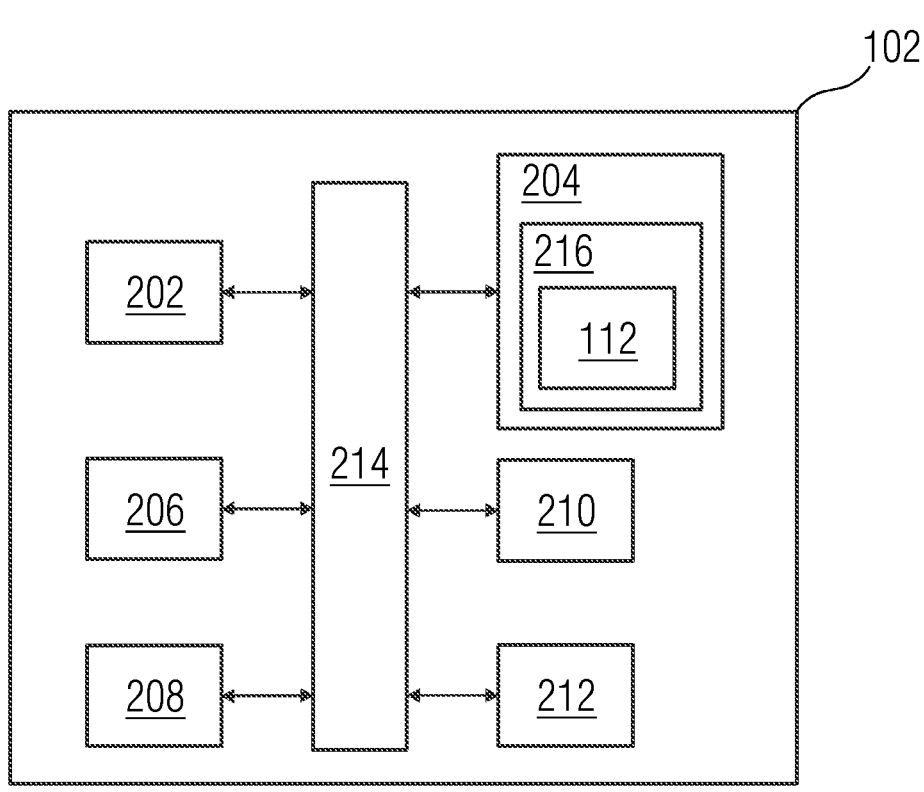
FIG. 2 is a block diagram of an engineering system, such as those shown in FIG. 1, in which an embodiment of the present invention can be implemented.

FIG. 2 is a block diagram of an engineering system 102, such as those shown in FIG. 1, in which an embodiment of the present invention can be implemented. In FIG. 2, the engineering system 102 includes a processing unit 202, an accessible memory 204, a storage unit 206, a communication interface 208, an input-output unit 210, a network interface 212 and a bus 214.

The processing unit 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The processing unit 202 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the processing unit 202, such as being a computer-readable storage medium. The processing unit 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes an integrated development environment (IDE) 216. The IDE 216 includes the data acquisition and analytics module 112 stored in the form of machine-readable instructions on any of the above-mentioned storage media and may be in communication with and executed by the processor(s) 202.

When executed by the processing unit 202, the data acquisition and analytics module 112 causes the processing unit 202 to seamlessly transition a runtime system from the controller device 124 to the digitalization platform 110. The runtime system translates an engineering program stored in the controller device 124 into machine executable code, and ultimately implements an execution of the engineering program in the controller device 124.

The engineering program comprises a plurality of programming blocks. In one example, the engineering program is a graphical program comprising a program logic. The engineering program comprises a set of programmable instructions or statements corresponding to the program logic. Each programming block of the plurality of programming blocks corresponds to a function block under an engineering design of the technical installation 106. The engineering design may comprise several such programming blocks. The controller device 124 is configured to execute the engineering program in a plurality of scan cycles.

When executed by the processing unit 202, the data acquisition and analytics module 112 causes the processing unit 202 to capture a plurality of input-output parameter values transmitted or received by the controller device 124 during a plurality of scan cycles of the execution of the engineering program. The plurality of input-output parameter values comprises a plurality of input parameter values and a plurality of output parameter values. Examples of the plurality of input parameter values comprises parameter values received by the controller device 124 from the plurality of sensor devices 126A-N and the plurality of human machine interfaces 120A-N.

In one example, the plurality of input-output parameter values further comprises information about a plurality of user actions that a user has performed on an input device connected to the controller device 124. The plurality of input-output parameter values further comprises the plurality of output parameter values generated by the controller device 124, in response to reception of the plurality of user actions. The plurality of output parameter values comprises parameter values transmitted by the controller device 124 or the digitalization platform 110 into the plurality of industrial devices 126A-N in the technical installation 106.

When executed by the processing unit 202, the data acquisition and analytics module 112 further causes the processing unit 202 to analyze the captured plurality of input-output parameter values. The processing unit 202 is configured to identify a plurality of patterns in the plurality of input-output parameter values based on the analysis. Furthermore, the processing unit 202 is further configured to identify a plurality of relationships between parameter values in the captured plurality of input-output parameter values.

The data acquisition and analytics module 112 further causes the processing unit 202 to generate an input knowledge graph, an output knowledge graph, and an input-output correspondence knowledge graph based on the analysis of the captured plurality of input-output parameter values. The input knowledge graph comprises information about a plurality of relationships between the plurality of input parameter values in the captured plurality of input-output parameter values. In one example, the plurality of relationships includes a sequence in which each of the plurality of input parameter values are received by the controller device 124. The processing unit 202 is configured to query the input knowledge graph to predict parameter values which are likely to be received by the controller device 124 during a future scan cycle of the execution of the engineering program in the controller device 124. The future scan cycle occurs subsequent to the plurality of scan cycles in which the plurality of input-output parameter values are captured. For example, the processing unit 202 is configured to query the input parameter knowledge graph to determine a next input parameter value which is likely to be received by the controller device 124, based on the captured input output parameter values.

The output knowledge graph comprises information about the plurality of relationships between the plurality of output parameter values which are transmitted by the controller device 124. The processing unit 202 is configured to query the output knowledge graph to predict output parameter values which are likely to be transmitted by the controller device 124 at the future scan cycle of execution of the engineering program in the controller device 124.

The input output correspondence knowledge graph comprises information about relationships between the each of the plurality of input parameter values and each of the plurality of output parameter values. The processing unit 202 is configured to query the input-output correspondence knowledge graph to predict an output parameter value which is likely to be transmitted by the controller device 124 for a given input parameter value received by the controller device 124.

The data acquisition and analytics module 112 further causes the processing unit 202 to generate an input-output knowledge graph based on the input knowledge graph, the output knowledge graph, and the input-output correspondence knowledge graph. In one example, the input-output knowledge graph is a three dimensional knowledge graph in which the input knowledge graph, the output knowledge graph and the input-output correspondence knowledge graph are represented as individual dimensions in the three dimensional knowledge graph.

In other words, the input-output knowledge graph comprises information about a first set of relationships between the plurality of input parameter values received by the controller device 124, from the plurality of sensor devices 126A-N. The input-output knowledge graph comprises information about a second set of relationships between the plurality of output parameter values transmitted by the controller device 124 to the plurality of industrial device 108A-N. The input-output knowledge graph comprises information about a third set of relationships between the plurality of input parameter values and the plurality of output parameter values.

The data acquisition and analytics module 112 further causes the processing unit 202 to receive a plurality of network connection parameters associated with the network connection 104 between the plurality of sensor devices 126A-N, the plurality of human machine interfaces 120A-N, and one of the controller device 124 or the digitalization platform 110. The plurality of network connection parameters comprises information associated with network strength, packet count, packet drop data, associated with the network connection 104 between the plurality of sensor devices 126A-N and one of the controller device 124 or the digitalization platform 110.

The data acquisition and analytics module 112 further causes the processing unit 202 to analyze the plurality of network connection parameters. In one example, the processing unit 202 is configured to analyse the plurality of network connection parameters based on a plurality of predefined thresholds. For example, the processing unit 202 is configured to determine whether the at least one of the plurality of network connection parameters is greater than a specific predefined threshold of the plurality of predefined thresholds.

The data acquisition and analytics module 112 further causes the processing unit 202 to determine whether the at least one connectivity error is present in the network connection 104 based on the analysis. In one example, the plurality of network connectivity parameters comprises a network strength. In such a case, the processing unit 202 is configured to determine whether the network strength drops below a predefined threshold. In a case where the network strength is determined to drop below the predefined threshold, the at least one connectivity error is determined to be present in the network connection 104 between the plurality of sensor devices 126A-N/the plurality of human machine interfaces 120A-N and one of the controller device 124 or the digitalization platform 110.

In a case where the at least one connectivity error is determined to be present in the network connection 104, the data acquisition and analytics module 112 causes the processing unit 202 to simulate a first input parameter value based on an analysis of the generated input-output knowledge graph. The simulated first input parameter values is a parameter value which is likely to be received by the controller devcie 112 during a duration in which the at least one connectivity error is present in the network connection.

In one example, the first input parameter value is simulated by the processing unit 202 by querying the input-output knowledge graph. It has been noted that the input-output knowledge graph comprises information about the plurality of relationships between the plurality of input parameter values received by the controller device 124 in the plurality of scan cycles. Thus, simulation of the first input parameter value, takes into account of the plurality of input parameter values received by the controller device 124 in the plurality of scan cycles. Thus, the simulated first input parameter value is accurate and is very likely to be received from the plurality of sensor devices 126A-N/the plurality of human machine interfaces 120A-N during execution of the engineering program. Furthermore, the controller device 124 and the digitalization platform 110 continues receiving input parameter values despite a presence of the at least one connection error in the network connection 104. Thus, execution of the engineering program is not halted.

In a case where the at least one connection error is determined to be absent, the processing unit 202 is configured to receive a second input parameter value from the plurality of sensor devices 126A-N. The second input parameter is received via the network connection 104. Examples of the second input parameter value comprises sensor data received from the plurality of sensor devices 126A-N and a plurality of user inputs received from the plurality of human machine interfaces 120A-N.

The data acquisition and analytics module 112 further causes the processing unit 202 to determine whether information about one of the simulated first input parameter value or the received second input parameter value is present in the input-output knowledge graph. In other words, the processing unit 202 is configured to determine whether the input-output knowledge graph comprises information about the plurality of relationships between the plurality of input parameter values received by the controller device 124 and the first input parameter value or the second input parameter value.

In a case where the input-output knowledge graph comprises information about the the the first input parameter value or the second input parameter value, the processing unit 202 is configured to query the input-output knowledge graph to generate at least one output parameter value. The at least one output parameter value is the parameter value which is likely to be generated by the controller device 124, after the first input parameter value or the second input parameter value are processed by the controller device 124. The at least one output parameter value is simulated based on analysis of the plurality of input-output parameter values received by the controller device during execution of the engineering program. Furthermore, the at least one output parameter is simulated based on an analysis of information associated with the plurality of relationships between parameter values in the captured plurality of input-output parameter values. Thus, the processing unit 202 simulates the at least one output parameter value with accuracy. Thus, generation of the at least one output parameter value is performed in the digitalization platform 110 rather than by the controller device 124. As a result, a processing power spent for processing the first parameter value or the second parameter value is taken up by the digitalization platform 110, rather than the controller device 124. Thus, a processing load of the controller device 124 is reduced. Hence, a processing capacity of the controller device 124 is increased.

The data acquisition and analytics module 112 further causes the processing unit 202 to determine whether one of the first input parameter value or the second input parameter value is a critical data item. In one example, one of the first input parameter value or the second input parameter value is determined to be the critical data item based on an application of an artificial intelligence model on the first input parameter value and the second input parameter value. In a case where it is determined that the first parameter value or the second parameter value is a critical data item, the first input parameter value or the second input parameter value is processed in the controller device 124. In one example, the artificial intelligence model is trained to detect the critical data item based on a training data set comprising a plurality of parameter values which are labelled as critical data items.

In a case where it is determined that information about the first parameter value or the second parameter value is absent in the input-output knowledge graph, the data acquisition and analytics module 112 further causes the processing unit 202 to transmit the first parameter value or the second parameter value to the controller device 124. The controller device 124 is configured to process the first parameter value or the second parameter value based on the execution of the engineering program. Further, the controller device 124 is configured to generate the at least one output parameter value from the first parameter value or the second parameter value by the execution of the engineering program.

The data acquisition and analytics module 112 further causes the processing unit 202 to transmit the generated at least one output parameter value from the controller device 124, to the plurality of industrial devices 108A-N. The data acquisition and analytics module 112 further causes the processing unit 202 to control the plurality of industrial devices 108A-N based on the transmitted at least one output parameter value and run the technical installation efficiently. Thus, the controller device 124 only has to process those parameter values which are not present in the input-output knowledge graph. Thus, processing load of the controller device 124 is reduced significantly and a major portion of processing of the plurality of input parameter values occurs in the digitalization platform 110. Thus, processing power spent for processing the first parameter value or the second parameter value is taken up by the digitalization platform 110, rather than the controller device 124. Thus, a processing load of the controller device 124 is reduced.

The data acquisition and analytics module 112 further causes the processing unit 202 to analyze the generated at least one output parameter value. The data acquisition and analytics module 112 further causes the processing unit 202 to modify the input-output knowledge graph based on the analysis of the at least one output parameter value, the first input parameter value and the second input parameter value. The input-output knowledge graph is modified such that a relationship between the first input parameter value, the second parameter value and the at least one output parameter value is recorded in the input-output knowledge graph.

Thus, in a case where the controller device 124 or the digitalization platform 110 receives a parameter value equal to the first input parameter value or the second parameter value in the future, the at least one output parameter value is readily generated by the digitalization platform 110 by querying the input-output knowledge graph. Thus, the processing load of the controller device 124 is further reduced. Eventually, the input-output knowledge graph accumulates information associated with all possible parameter values which is likely to be received by the controller device 124. In such a case, the digitalization platform 110 will be enabled to generate a plurality of output parameter values for all possible combinations of input parameter values received by the controller device 124. Thus, a runtime system of the technical installation 106 is seamless transitioned from the controller device 124 into the digitalization platform 110.

The data acquisition and analytics module 112 further causes the processing unit 202 to analyze a plurality of programming blocks of the engineering program executed by the controller device 124. The data acquisition and analytics module 112 further causes the processing unit 202 to determine a plurality of program execution parameters of the controller device 124. The plurality of program execution parameters comprise information about internal functioning of the controller device 124 during execution of the engineering program. For example, the plurality of program execution parameters comprises runtime information such as information about memory fragmentation, scan cycle nature, system resource utilization, and memory utilization of the controller device 124 during the execution of the engineering program in the controller device 124. The data acquisition and analytics module 112 further causes the processing unit 202 to determine an efficiency of execution of the engineering program by the controller device 124.

The data acquisition and analytics module 112 further causes the processing unit 202 to determine that one or more programming blocks in the engineering program are hampering the efficiency of the execution of the engineering program. The data acquisition and analytics module 112 further causes the processing unit 202 to select the one or more programming blocks to be transformed based on the determination that the efficiency of execution of the engineering program is hampered because of the one or more programming blocks. The data acquisition and analytics module 112 further causes the processing unit 202 to apply an artificial intelligence model on the selected one or more programming blocks. The artificial intelligence model is trained to transform the determined one or more programming blocks to optimize the efficiency of execution of the engineering program by the controller device 124.

The data acquisition and analytics module 112 further causes the processing unit 202 to transform the plurality of programming blocks based on the application of the artificial intelligence model on the engineering program. The data acquisition and analytics module 112 further causes the processing unit 202 to migrate the transformed plurality of programming blocks to the digitalization platform 110.

In another embodiment, the data acquisition and analytics module 112 causes the processing unit 202 to receive a first input-output knowledge graph comprising information about a plurality of relationships between the plurality of input-output parameter values which are transmitted or received by the controller device 124. The plurality of input-output parameter values comprises a plurality of input parameter values and a plurality of output parameter values. Examples of the plurality of input parameter values comprises parameter values received by the controller device 124 from the plurality of sensor devices 126A-N and the plurality of human machine interfaces 120A-N. The plurality of input parameter values comprises sensor data, programming instructions, user commands, and user inputs. In one example, the plurality of input parameter values comprises a plurality of user actions performed by a user on the plurality of human machine interfaces 120A-N. Examples of the plurality of user actions comprises user commands, user inputs and user selections input by the user in an input device of the plurality of human machine interfaces 120A-N. The plurality of output parameter values comprises parameter values transmitted by the controller device 124 and the digitalization platform 110 into the plurality of industrial devices 108A-N in the technical installation 106. The plurality of output parameter values comprises control signals transmitted by the controller device 124 based on the reception of the plurality of user actions. The user may input the plurality of user actions to perform a task using the executed engineering program. The plurality of user actions are arranged as workflows. The user is enabled to execute a workflow comprising a set of user actions to perform the task. In one example, the same task can be performed using one of a first workflow and a second workflow.

The data acquisition and analytics module 112 causes the processing unit 202 to determine the first workflow comprising a first set of user actions to perform a task using the engineering program. In one example, the task is an engineering task which is performed via the engineering system

102. In another example, the task is a control task to control the plurality of industrial devices 108A-N in the technical installation 106. The information associated with the first workflow is present in the first input-output knowledge graph. The information associated with the first workflow comprises information about a plurality of relationships between the first set of user actions in the first workflow. Furthermore, the first input-output knowledge graph comprises information about a sequence in which the first set of user actions are executed by the user.

The data acquisition and analytics module 112 further causes the processing unit 202 to receive a second workflow comprising a second set of user actions to perform the same task using the engineering program. The second set of user actions is different from the first set of user actions. The information associated with the second workflow is present in a second input-output knowledge graph which is stored in a database. The second input-output knowledge graph comprises information about a sequence of user actions in the second workflow and also information about individual user actions in the second workflow.

The data acquisition and analytics module 112 causes the processing unit 202 to compare the first input-output knowledge graph with the second input-output knowledge graph. In one example, the first input-output knowledge graph is compared with the second input-output knowledge graph based on a correlation operation between the two knowledge graphs.

The data acquisition and analytics module 112 causes the processing unit 202 to determine a process efficiency of the first workflow and the second workflow based on the correlation operation. In one example, the process efficiency of the first workflow and the second workflow is determined by executing the first and second workflow on a digital twin of the controller device 124 and calculating time taken to perform the task using each of the first and the second workflows. The process efficiency of each of the first and second workflow is an indicator of efficiency with which a respective workflow completes the task.

The data acquisition and analytics module 112 causes the processing unit 202 to determine whether the process efficiency of the second workflow is greater than the process efficiency of the first workflow. In a case where the process efficiency of the second workflow is greater than that of the first workflow, the data acquisition and analytics module 112 causes the processing unit 202 to determine one or more knowledge graph instances in the second input-output knowledge graph which correspond to the second workflow.

The data acquisition and analytics module 112 causes the processing unit 202 to receive the determined one or more knowledge graph instances from the second input-output knowledge graph. The data acquisition and analytics module 112 causes the processing unit 202 to determine whether at least one connectivity error is present in the network connection 104 between the plurality of sensor devices 126A-N and one of the controller device 124 or the digitalization platform 110. The at least one connectivity issue is determined based on an analysis of a plurality of network connection parameters associated with the network connection 104.

The data acquisition and analytics module 112 causes the processing unit 202 to simulate, when the at least one connectivity error is determined to present, a first input parameter value based on an analysis of the modified input-output knowledge graph. The first input parameter value is a parameter value which is likely to be received from the plurality of sensor devices 126A-N during execution of the engineering program. In one example, the first input parameter value comprises information about a user action which is likely to be received by the controller devicev 124 during execution of the engineering program.

The data acquisition and analytics module 112 causes the processing unit 202 to receive, when it is determined that the at least one connectivity error is absent in the network connection 104, a second input parameter value from the plurality of sensor devices 126A-N. The second input parameter value is at least one of a control signal, a sensor data signal, and a user input from the first user.

The data acquisition and analytics module 112 causes the processing unit 202 to determine whether one of the first or the second input parameter value is present in the first input output parameter value. The data acquisition and analytics module 112 causes the processing unit 202 to determine whether a relationship between one of the first and the second input parameter value with any of the plurality of input-output parameter values is recorded in the first input-output knowledge graph. If the information about at least one of the first and the second input parameter value is present in the first input-output knowledge graph, The data acquisition and analytics module 112 causes the processing unit 202 to generate the at least one output parameter by simply querying the first input-output knowledge graph. In a case where the information about one of the first or the second input parameter value is absent in the first input-output knowledge graph, the data acquisition and analytics module 112 causes the processing unit 202 to determine whether the information about the first or the second input parameter is present in a second input-output knowledge graph stored in the database 114.

In a case where it is determined that the information about the first or the second input parameter value is present in the second input-output knowledge graph, the data acquisition and analytics module 112 causes the processing unit 202 to select one or more knowledge graph instances within the second input-output knowledge graph. The one or more knowledge graph instances comprises information about the first or the second input parameter value. The one or more knowledge graph instances further comprises information about one or more parameter values which are likely to be received by the controller device 124, in a future scan cycle of execution of the engineering program.

The data acquisition and analytics module 112 causes the processing unit 202 to analyze the first input-output knowledge graph to categorize a plurality of portions of the first input-output knowledge graph into an active section and a latent section. The active section comprises information about a first set of parameter values which are to be processed in a current scan cycle of execution of the engineering program. The latent section comprises information about a second set of parameter values which are to be processed in a future scan cycle of execution of the engineering program.

The data acquisition and analytics module 112 causes the processing unit 202 to map the received one or more knowledge graph instances into one of the active section or the latent section of the first input-output knowledge graph. The data acquisition and analytics module 112 causes the processing unit 202 to modify the received one or more knowledge graphs into the first input-output knowledge graph based on a set of cognitive rules.

The data acquisition and analytics module 112 causes the processing unit 202 to generate at least one output parameter value from the simulated first input parameter value. The data acquisition and analytics module 112 causes the processing unit 202 to transmit the generated at least one output parameter value to at least one device in the technical installation, to control the at least one device.

The communication interface 208 is configured for establishing communication sessions between the plurality of human machine interfaces 120A-N, the engineering system 102, and the controller device 124. The communication interface 208 allows the one or more engineering applications running on the plurality of human machine interfaces 120A-N to import/export engineering programs into the controller device 124. In an embodiment, the communication interface 208 interacts with the interface at the plurality of human machine interfaces 120A-N for allowing the engineers to access the engineering programs associated with an engineering project file and perform one or more actions on the engineering programs stored in the engineering system 102.

The input-output unit 210 may include input devices a keypad, touch-sensitive display, camera (such as a camera receiving gesture-based inputs), etc. capable of receiving one or more input signals, such as user commands to process engineering project file. Also, the input-output unit 210 may be a display unit for displaying a graphical user interface which visualizes the behavior model associated with the modified engineering programs and also displays the status information associated with each set of actions performed on the graphical user interface. The set of actions may include execution of predefined tests, download, compile and deploy of graphical programs. The bus 214 acts as interconnect between the processor 202, the memory 204, and the input-output unit 210.

The network interface 212 may be configured to handle network connectivity, bandwidth and network traffic between the engineering system 102, plurality of human machine interfaces 120A-N and the technical installation 106.

Those of ordinary skilled in the art will appreciate that the hardware depicted in FIG. 2 may vary for particular implementations. For example, other peripheral devices such as an optical disk drive and the like, Local Area Network (LAN), Wide Area Network (WAN), Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

Those skilled in the art will recognize that, for simplicity and clarity, the full structure and operation of all data processing systems suitable for use with the present disclosure is not being depicted or described herein. Instead, only so much of an engineering system 102 as is unique to the present disclosure or necessary for an understanding of the present disclosure is depicted and described. The remainder of the construction and operation of the engineering system 102 may conform to any of the various current implementation and practices known in the art.

Figure 3:
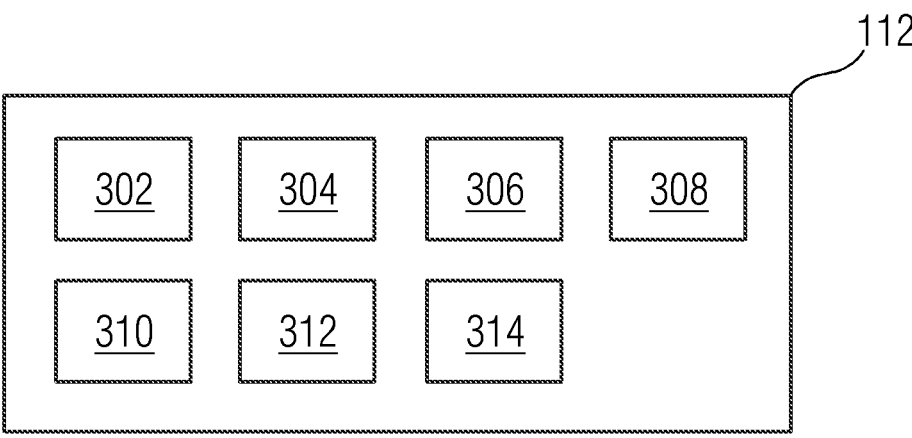
FIG. 3 is a block diagram of an data acquisition and analytics modele, such as those shown in FIG. 2, in which an embodiment of the present invention can be implemented.
Figure 4A:
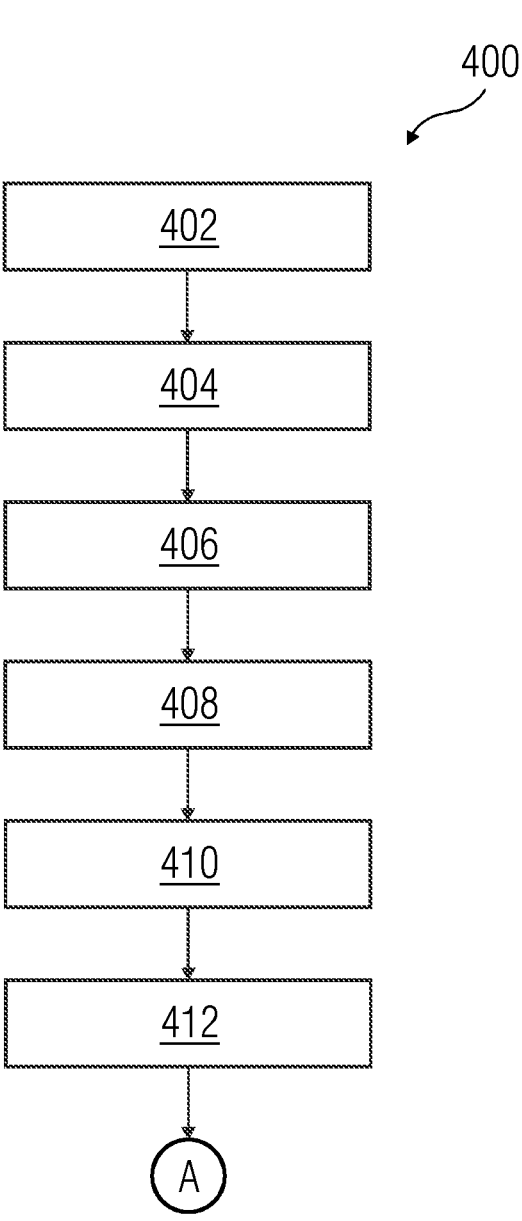
FIG. 4A is a process flowchart illustrating an exemplary method of seamlessly transitioning a runtime system from a controller device to a digitalization platform, according to an embodiment of the present invention.
Figure 4B:
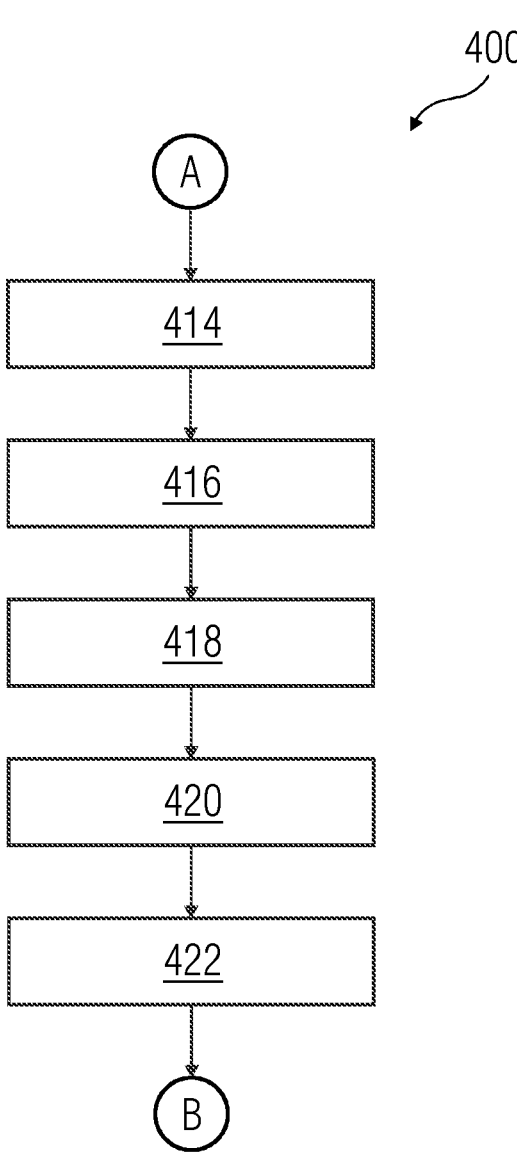
FIG. 4B is a process flowchart illustrating an exemplary method of seamlessly transitioning a runtime system from a controller device to a digitalization platform, according to an embodiment of the present invention.
Figure 4C:
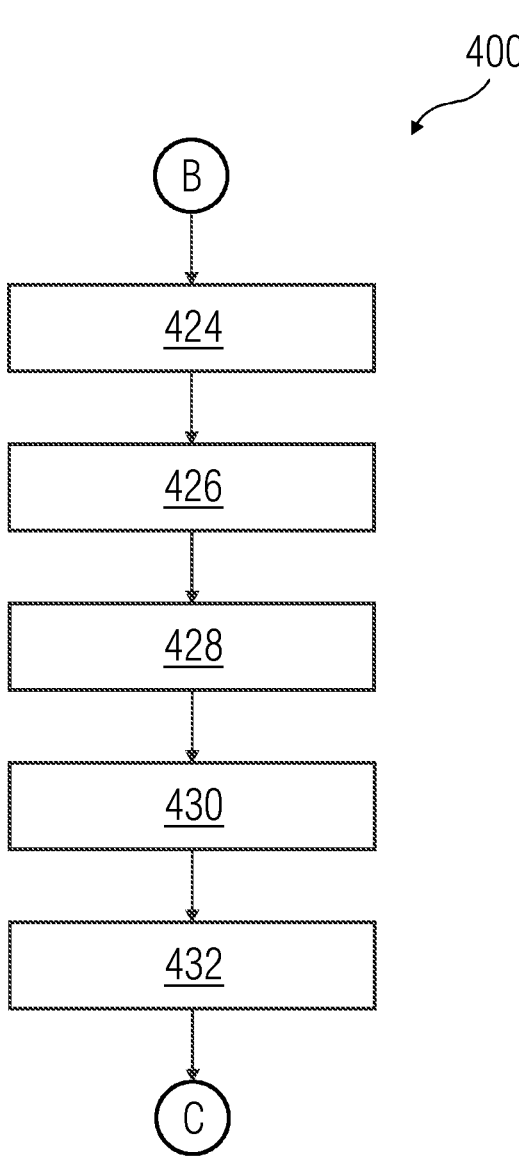
FIG. 4C is a process flowchart illustrating an exemplary method of seamlessly transitioning a runtime system from a controller device to a digitalization platform, according to an embodiment of the present invention.
Figure 4D:
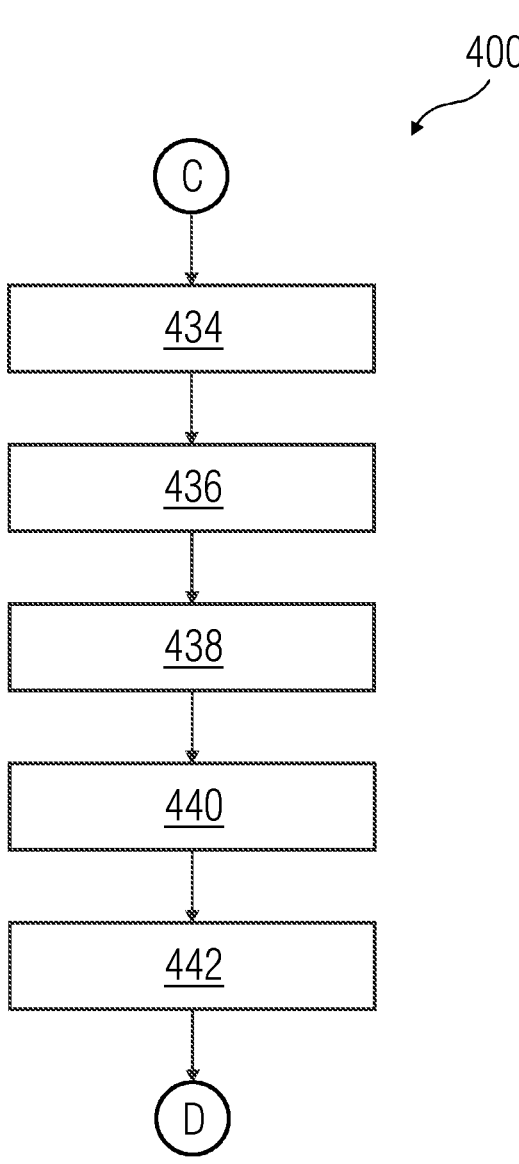
FIG. 4D is a process flowchart illustrating an exemplary method of seamlessly transitioning a runtime system from a controller device to a digitalization platform, according to an embodiment of the present invention.
Figure 4E:
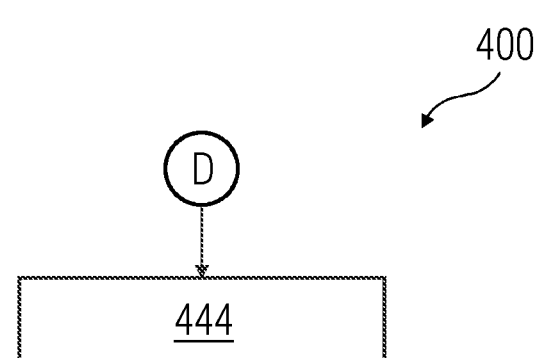
FIG. 4E is a process flowchart illustrating an exemplary method of seamlessly transitioning a runtime system from a controller device to a digitalization platform, according to an embodiment of the present invention.
Figure 5A:
FIG. 5A is a process flowchart illustrating an exemplary method of seamlessly transitioning a runtime system from a controller device to a digitalization platform, according to another embodiment of the present invention.
Figure 5A:
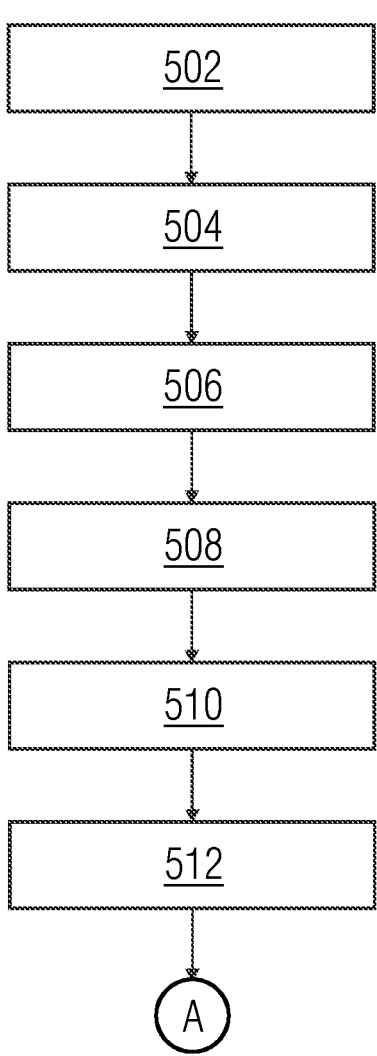
Figure 5B:
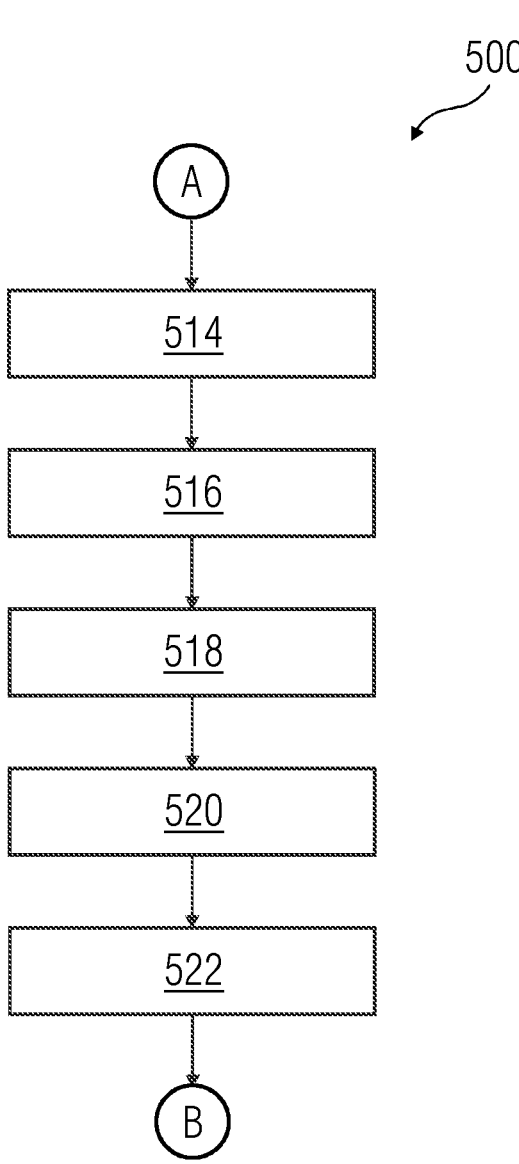
FIG. 5B is a process flowchart illustrating an exemplary method of seamlessly transitioning a runtime system from a controller device to a digitalization platform, according to another embodiment of the present invention.
Figure 5C:
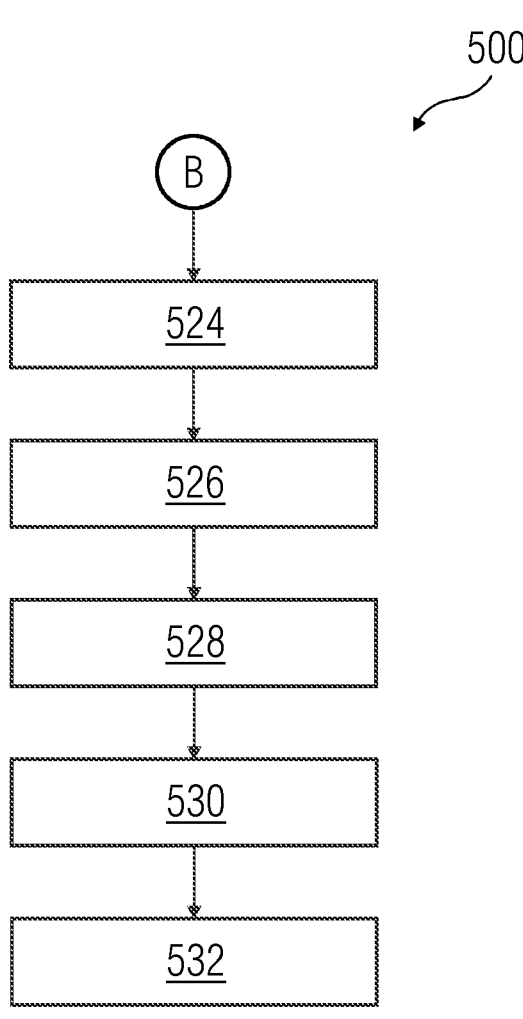
FIG. 5C is a process flowchart illustrating an exemplary method of seamlessly transitioning a runtime system from a controller device to a digitalization platform, according to another embodiment of the present invention.

FIG. 3 is a block diagram of the data analytics and acquisition 112, such as those shown in FIG. 2, in which an embodiment of the present invention can be implemented. In FIG. 3, the data analytics and acquisition 112 comprises a request handler module 302, a digital twin generation module 304, an analysis module 306, a modifier module 308, an engineering object database 310, a validation module 312 and a deployment module 314. FIG. 3 is explained in conjunction with FIG. 1 and FIG. 2.

The request handler module 302 is configured for receiving the request to initiate transition of a runtime system from the controller device 124 to the digitalization platform 110 in the technical installation 106. For example, the request is received from one of the one or more users external to the industrial environment 100 via a network. In alternative embodiment, the request is received from the one or the plurality of human machine interfaces 120A-N via the network. The request handler module 302 is further configured to capture the plurality of input-output parameter values received or transmitted by the controller device 124.

The digital twin generation module 304 is configured for analyzing the plurality of input-output parameter values captured from the controller device 124. The digital twin generation module 304 is configured to generate the input knowledge graph, the output knowledge graph and the input output correspondence knowledge graph. The digital twin generation module 304 is further configured to generate the input-output knowledge graph.

The analysis module 306 is configured for analyzing the plurality of network connection parameters to predict a presence of the at least connectivity error in the network connection 104. The analysis module 306 is further configured to detect whether the simulated first input parameter value or the received second parameter value is present in the input-output knowledge graph.

The modifier module 308 is configured for modifying the input-output knowledge graph by appending the one or more knowledge graph instances to the input-output knowledge graph based on the set of cognitive rules. The modifier module 308 is further configured to transform the plurality of programming blocks in the engineering program based on the application of the artifical intelligence model on the plurality of programming blocks of the engineering program.

The engineering object database 310 is configured for generating an engineering object library comprising generated object behavior models, information about the plurality of industrial devices 108A-N, physical connections between the plurality of industrial devices 108A-N, and a plurality of threshold parameter values associated with the plurality of industrial devices 108A-N and the physical connections. The engineering object database 310 is configured for continuously updating the engineering object library with updated versions of the engineering programs.

The validation module 312 is configured to validate the engineering program which is executed by the controller device. The validation module 312 is configured to simulate execution of the engineering program by the controller device 124 of the technical installation 106 in a simulation environment by executing the engineering program on a digital twin of the controller device 124.

The deployment module 314 is configured for transitioning execution of the engineering program in real-time from the controller device 124 to the digitalization platform 110.

FIG. 4A-E is a process flowchart illustrating an exemplary method 400 of seamlessly transitioning a runtime system from the controller device 124 to the digitalization platform 110, according to an embodiment of the present invention. FIG. 4A-E is explained in conjunction with FIG. 1 to 3.

At step 402, a plurality of input-output parameter values transmitted or received by the controller device 124 during a plurality of scan cycles of the execution of the engineering program are captured by the processing unit 202. Examples of the plurality of input parameter values comprises parameter values received by the controller device 124 from the plurality of sensor devices 126A-N and the plurality of human machine interfaces 120A-N.

At step 404, the captured plurality of input-output parameter values are analyzed by the processing unit 202. The processing unit 202 is configured to identify a plurality of patterns in the plurality of input-output parameter values based on the analysis. Furthermore, the processing unit 202 is further configured to identify a plurality of relationships between parameter values in the captured plurality of input-output parameter values.

At step 406, an input knowledge graph, an output knowledge graph, and an input-output correspondence knowledge graph are generated by the processing unit 202 based on the analysis of the captured plurality of input-output parameter values. The input knowledge graph comprises information about a plurality of relationships between the plurality of input parameter values in the captured plurality of input-output parameter values. In one example, the plurality of relationships includes a sequence in which each of the plurality of input parameter values are received by the controller device 124.

At step 408, the input knowledge graph is queried by the processing unit 202 to predict parameter values which are likely to be received by the controller device 124 during a future scan cycle of the execution of the engineering program in the controller device 124. The future scan cycle occurs subsequent to the plurality of scan cycles in which plurality of input-output parameter values are captured by the processing unit 202. For example, the processing unit 202 is configured to query the input parameter knowledge graph to determine a next input parameter value which is likely to be received by the controller device 124, based on the captured plurality of input output parameter values.

The output knowledge graph comprises information about the plurality of relationships between the plurality of output parameter values which are transmitted by the controller device 124. The processing unit 202 is configured to query the output knowledge graph to predict output parameter values which are likely to be transmitted by the controller device 124 at the future scan cycle of execution of the engineering program in the controller device 124.

The input output correspondence knowledge graph comprises information about relationships between the each of the plurality of input parameter values and each of the plurality of output parameter values. The processing unit 202 is configured to query the input output correspondence knowledge graph to predict an output parameter value which is likely to be transmitted by the controller device 124 for a given input parameter value received by the controller device 124.

At step 410, an input-output knowledge graph is generated by the processing unit 202 based on the input knowledge graph, the output knowledge graph, and the input-output knowledge graph.

In one example, the input-output knowledge graph is a three dimensional knowledge graph in which the input knowledge graph, the output knowledge graph and the input-output knowledge graph are represented as individual dimensions in the three dimensional knowledge graph. In other words, the input-output knowledge graph comprises information about a first set of relationships between the plurality of input parameter values received by the controller device 124, from the plurality of sensor devices 126A-N. The input-output knowledge graph comprises information about a second set of relationships between the plurality of output parameter values transmitted by the controller device 124 to the plurality of industrial device 108A-N. The input-output knowledge graph comprises information about a third set of relationships between the plurality of input parameter values and the plurality of output parameter values.

At step 412, a plurality of network connection parameters associated with the network connection 104 between the plurality of sensor devices 126A-N and one of the controller device 124 or the digitalization platform 110, is received by the processing unit 202. The plurality of network connection parameters comprises information associated with network strength, packet count, packet drop data, associated with the network connection 104 between the plurality of sensor devices 126A-N and one of the controller device 124 or the digitalization platform 110.

At step 414, the plurality of network connection parameters are analyzed by the processing unit 202. In one example, the processing unit 202 is configured to analyse the plurality of network connection parameters based on a plurality of predefined thresholds. For example, the processing unit 202 is configured to determine whether the at least one of the plurality of network connection parameters is greater than a specific predefined threshold of the plurality of predefined thresholds.

At step 416, it is determined by the processing unit 202 whether the at least one connectivity error is present in the network connection 104 based on the analysis. For example, in a case where the plurality of network connectivity parameters comprises a network strength, the processing unit 202 is configured to determine whether the network strength drops below a predefined threshold. In a case where the network strength is determined to drop below the predefined threshold, the at least one connectivity error is determined to be present in the network connection 104 between the plurality of sensor devices 126A-N/the plurality of human machine interfaces 120A-N and one of the controller device 124 or the digitalization platform 110.

At step 418, in a case where the at least one connectivity error is determined to be present in the network connection 104, a first input parameter value is simulated by the processing unit 202 based on an analysis of the generated input-output knowledge graph. The simulated first input parameter values is a parameter value which is likely to be received by the controller device 124 during a duration in which the at least one connectivity error is present in the network connection 104.

In one example, the first input parameter value is simulated by the processing unit 202 by querying the input-output knowledge graph. It has been noted that the input-output knowledge graph comprises information about the plurality of relationships between the plurality of input parameter values received by the controller device 124 in the plurality of scan cycles. Thus, simulation of the first input parameter value, takes into account of the plurality of input parameter values received by the controller device 124 in the plurality of scan cycles. Thus, the simulated first input parameter value is accurate and is very likely to be received from the plurality of sensor devices 126A-N/the plurality of human machine interfaces 120A-N during execution of the engineering program. Furthermore, the controller device 124 and the digitalization platform 110 continues receiving input parameter values despite a presence of the at least one connection error in the network connection 104. Thus, execution of the engineering program is not halted.

At step 420, in a case where the at least one connection error is determined to be absent, a second input parameter value is received by the processing unit 202 from the plurality of sensor devices 126A-N. The second input parameter value is received via the network connection 104. Examples of the second input parameter value comprises sensor data received from the plurality of sensor devices 126A-N and a plurality of user inputs received from the plurality of human machine interfaces 120 A-N.

At step 422, it is determined by the processing unit 202 whether information about one of the simulated first input parameter value or the received second input parameter value is present in the input-output knowledge graph. In other words, the processing unit 202 is configured to determine whether the input-output knowledge graph comprises information about the plurality of relationships between the plurality of input parameter values received by the controller device 124 and the first input parameter value or the second input parameter value.

At step 424, in a case where the input-output knowledge graph is determined to comprise information about the the first input parameter value or the second input parameter value, the processing unit 202 is configured to query the input-output knowledge graph to generate at least one output parameter value. The at least one output parameter value is the parameter value which is likely to be generated by the controller device 124, after the first input parameter value or the second input parameter value are processed the controller device 124. The at least one output parameter value is simulated based on analysis the plurality of input-output parameter values received by the controller device 124 during execution of the engineering program. Furthermore, the at least one output parameter is simulated based on an analysis of information associated with the plurality of relationships between parameter values in the captured plurality of input-output parameter values. Thus, the processing unit 202 is enabled to simulate the at least one output parameter value with accuracy. Thus, generation of the at least one output parameter value is performed in the digitalization platform 110 rather than by the controller device 124. Thus, processing power spent for processing the first parameter value or the second parameter value is taken up by the digitalization platform 110, rather than the controller device 124. Thus, a processing load of the controller device 124 is reduced. As a result, a processing capacity of the controller device 124 is increased.

At step 426, it is determined by the processing unit 202 whether one of the first input parameter value or the second input parameter value is a critical data item. In one example, one of the first input parameter value or the second input parameter value is determined to be the critical data item based on an application of an artificial intelligence model on the first input parameter value and the second input parameter value. In a case where it is determined that the first parameter value or the second parameter value is a critical data item, the first input parameter value or the second input parameter value is processed in the controller device 124. In one example, the artificial intelligence model is trained to detect the critical data item based on a training data set comprising a plurality of critical data items.

At step 428, it is determined by the processing unit 202 that information about the first parameter value or the second parameter value is absent in the input-output knowledge graph. In such a case, the first parameter value or the second parameter value is transmitted by the processing unit 202 to the controller device 124. The controller device 124 is configured to process the first parameter value or the second parameter value based on the execution of the engineering program. Further, the controller device 124 is configured to generate the at least one output parameter value from the first parameter value or the second parameter value by the execution of the engineering program.

At step 430, the generated at least one output parameter is transmitted by the processing unit 202 from the controller device 124, to the plurality of industrial devices 108A-N.

At step 432, the plurality of industrial devices 108A-N are controlled by the processing unit 202 based on the transmitted at least one output parameter. Thus, the technical installation 106 is run efficiently. Thus, the controller device 124 only has to process those parameter values which are not present in the input-output knowledge graph. Thus, processing load of the controller device 124 is reduced significantly and majority of parameter value processing occurs in the digitalization platform 110. Thus, processing power spent for processing the first parameter value or the second parameter value is taken up by the digitalization platform 110, rather than the controller device 124. Thus, a processing load of the controller device 124 is reduced.

At step 434, the generated at least one output parameter value is analyzed by the processing unit 202. At step 436, the input-output knowledge graph is modified by the processing unit 202 based on the analysis of the at least one output parameter value, the first input parameter value and the second input parameter value. The input-output knowledge graph is modified such that a relationship between the first input parameter value, the second parameter value and the at least one output parameter value is recorded in the input-output knowledge graph.

Thus, in a case where the controller device 124 or the digitalization platform 110 receives a parameter value equal to the first input parameter value or the second parameter value in the future, an output parameter value is readily generated by querying the input-output knowledge graph. Thus, the processing load of the controller device 124 is further reduced. Eventually, the input-output knowledge graph accumulates information associated with all possible parameter values which is likely to be received by the controller device 124. In such a case, the digitalization platform 110 will be enabled to generate a plurality of output parameter values for all possible combinations of input parameter values received by the controller device 124. Thus, a runtime of the technical installation 106 is seamless transitioned from the controller device 124 into the digitalization platform 110.

At step 436, a plurality of programming blocks of the engineering program executed by the controller device 124, is analyzed by the processing unit 202. The data acquisition and analytics module 112 further causes the processing unit 202 to determine a plurality of program execution parameters of the controller device 124. The plurality of program execution parameters comprise information about internal functioning of the controller device 124 during execution of the engineering program. For example, the plurality of program execution parameters comprises runtime information such as information about memory fragmentation, scan cycle nature, system resource utilization, and memory utilization of the controller device during the execution of the engineering program in the controller device. Further, an efficiency of execution of the engineering program by the controller device 124 is determined by the processing unit 202 based on the plurality of program execution parameters.

At step 438, one or more programming blocks of the engineering program, are determined by the processing unit 202 to be hampering efficiency of the execution of the engineering program, are determined by the processing unit 202. At step 440, the one or more programming blocks to be transformed are selected based on the processing unit 202 based on the determined efficiency of execution of the engineering program by the controller device. At step 442, the artificial intelligence model is applied by the processing unit 202 on the selected one or more programming blocks. The artificial intelligence model is trained to transform the determined one or more programming blocks to optimize the efficiency of execution of the engineering program by the controller device 124.

At step 444, the plurality of programming blocks are transformed by the processing unit 202 based on the application of the artificial intelligence model on the engineering program. The data acquisition and analytics module 112 further causes the processing unit 202 to migrate the transformed plurality of programming blocks to the digitalization platform 110.

FIG. 5A-E is a process flowchart illustrating an exemplary method 400 of seamlessly transitioning a runtime system from the controller device 124 to the digitalization platform 110, according to an embodiment of the present invention.

At step 502, a first input-output knowledge graph comprising information about a plurality of relationships between a plurality of input-output parameter values which are transmitted or received by the controller device 124, are captured by the processing unit 202. The plurality of input-output parameter values comprises a plurality of input parameter values and a plurality of output parameter values. Examples of the plurality of input parameter values comprises parameter values received by the controller device 124 from the plurality of human machine interfaces 122A-N. The plurality of input parameter values comprises sensor data, user commands, and user inputs.

In one example, the plurality of input parameter values comprises a plurality of user actions performed by a user on the plurality of human machine interfaces 122A-N. Examples of the plurality of user actions comprises user commands, user inputs and user selections input by the user in an input device of the plurality of human machine interfaces 122A-N. The plurality of output parameter values comprises parameter values transmitted by the controller device 124 and the digitalization platform 110 into the plurality of industrial devices 108A-N in the technical installation 106.

The plurality of output parameter values comprises control signals transmitted by the controller device 124 based on the reception of the plurality of user actions. The user may input the plurality of user actions to perform a task using the executed engineering program. The plurality of user actions are arranged as workflows. The user is enabled to execute a workflow comprising a set of user actions to perform the task. In one example, the task can be performed using one of a first workflow and a second workflow.

At step 504, the first workflow comprising a first set of user actions to perform a task using the engineering program is determined by the processing unit 202. In one example, the task is an engineering task which is performed via the engineering system 100. In another example, the task is a control task to control the plurality of industrial devices 108A-N in the technical installation 106. The information associated with the first workflow is present in the first input-output knowledge graph. The information associated with the first workflow comprises information about a plurality of relationships between the first set of user actions in the first workflow. For example, the information about the plurality of relationships comprises information about a sequence in which each of the first set of user actions are executed.

At step 506, a second workflow comprising a second set of user actions to perform the same task using the engineering program is received by the processing unit 202. The second set of user actions is different from the first set of user actions. The information associated with the second workflow is present in a second input-output knowledge graph which is stored in a database. The second input-output knowledge graph comprises information about a sequence of user actions in the second workflow and also information about individual user actions in the second workflow.

At step 508, the first input-output knowledge graph is compared by the processing unit 202 with the second input-output knowledge graph. In one example, the first input-output knowledge graph is compared with the second input-output knowledge graph based on a correlation operation between the two knowledge graphs.

At step 510, a process efficiency of the first workflow and the second workflow is determined by the processing unit 202 based on the comparison. In one example, the process efficiency of the first workflow and the second workflow is determined by executing the first and second workflow on a digital twin of the controller device 124. The process efficiency of each of the first and second workflows is an indicator of efficiency with which a respective workflow completes the task.

At step 512, it is determined whether the process efficiency of the second workflow is greater than the process efficiency of the first workflow. In a case where the process efficiency of the second workflow is greater than that of the first workflow, the processing unit 202 is configured to determine one or more knowledge graph instances in the second input-output knowledge graph which correspond to the second workflow.

At step 514, the determined one or more knowledge graph instances are received by the processing unit 202 from the second input-output knowledge graph. At step 516, it is determined by the processing unit 202 whether at least one connectivity error is present in the network connection 104 between the plurality of sensor devices 126A-N and one of the controller device 124 or the digitalization platform 110. The at least one connectivity issue is determined based on an analysis of a plurality of network connection parameters associated with the network connection 104.

At step 518, if the connectivity error is determined to present, a first input parameter value is generated by the processing unit 202 based on an analysis of the modified input-output knowledge graph. The first input parameter value is a parameter value which is likely to be received from the plurality of sensor devices 126A-N during execution of the engineering program. In one example, the first input parameter value comprises information about a user action which is likely to be received by the controller device 124 during execution of the engineering program.

At step 520, when it is determined that the connectivity error is absent in the network connection 104, a second input parameter value is received by the processing unit 202 from the plurality of sensor devices 126A-N. The second input parameter value is at least one of a control signal, a sensor data signal, and a user input from the first user.

At step 522, it is determined by the processing unit 202 whether one of the first or the second input parameter value is present in the first input output parameter value. At step 524, it is determined by the processing unit 202 whether a relationship between one of the first and the second input parameter value with any of the plurality of input-output parameter values is recorded in the first input-output knowledge graph. If the information about at least one of the first and the second input parameter value is present in the first input-output knowledge graph, the processing unit 202 is configured to generate the at least one output parameter by simply querying the first input-output knowledge graph. In a case where the information about one of the first or the second input parameter value is absent in the first input-output knowledge graph, the processing unit 202 is configured to determine whether the information about the first or the second input parameter is present in a second input-output knowledge graph stored in the database.

At step 526, in a case where it is determined that the information about the first or the second input parameter value is present in the second input-output knowledge graph, one or more knowledge graph instances within the second input-output knowledge graph are selected by the processing unit 202. The selected one or more knowledge graph instances comprises information about the first or the second input parameter value. The one or more knowledge graph instances further comprises information about one or more parameter values which are likely to be received by the controller device 124, in a future scan cycle of execution of the engineering program.

At step 528, the first input-output knowledge graph is analyzed by the processing unit 202 to categorize a plurality of portions of the first input-output knowledge graph into an active section and a latent section. The active section comprises information about a first set of parameter values which are to be processed in a current scan cycle of execution of the engineering program. The latent section comprises information about a second set of parameter values which are to be processed in a future scan cycle of execution of the engineering program.

At step 530, the received one or more knowledge graph instances are mapped by the processing unit 202 into one of the active section or the latent section of the first input-output knowledge graph. Further, the received one or more knowledge graph instances are appended into the first input-output knowledge graph by the processing unit 202 based on a set of cognitive rules.

At step 532, at least one output parameter value is generated by the processing unit 202 from the simulated first input parameter value. The data acquisition and analytics module 112 causes the processing unit 202 to transmit the generated at least one output parameter value to at least one device in the technical installation 106, to control the at least one device.

Figure 6:
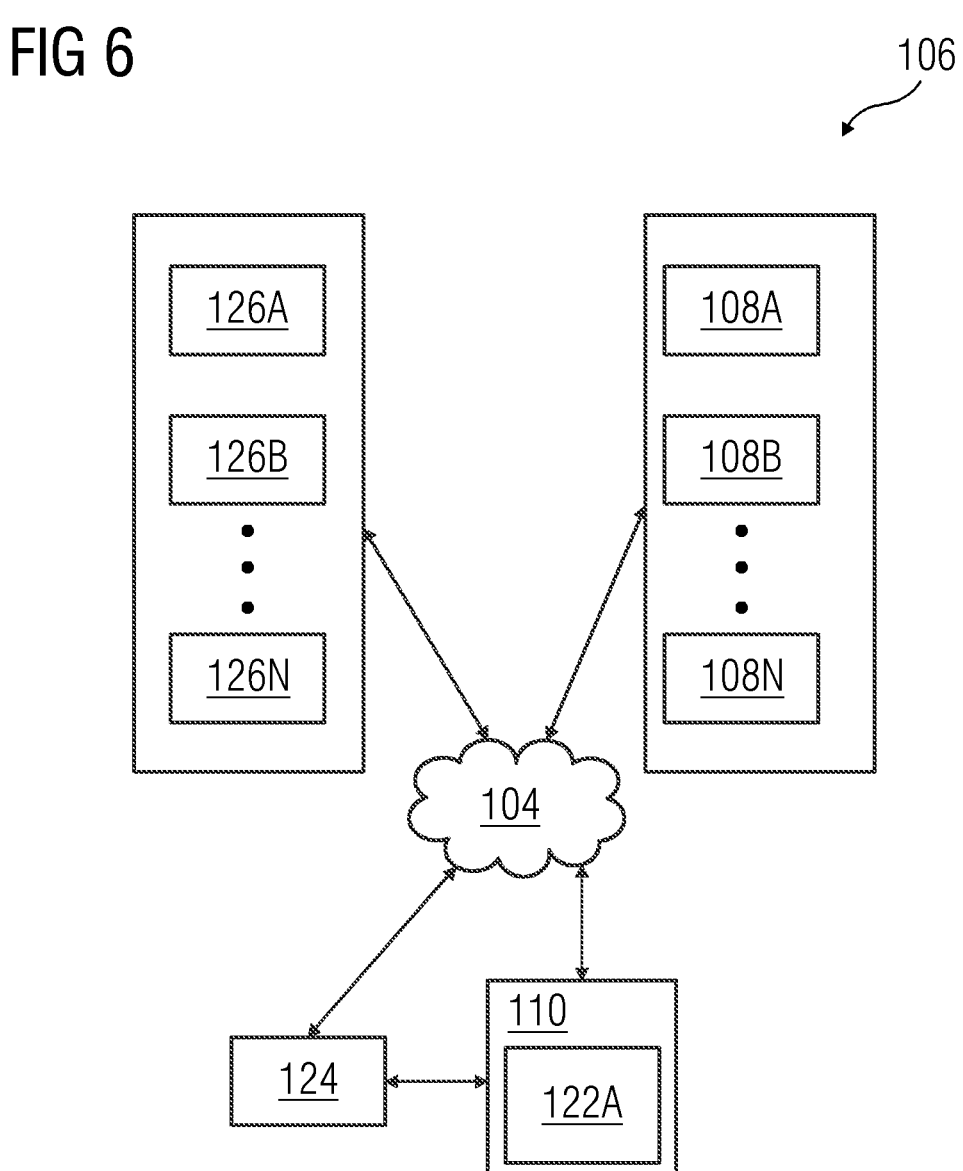
FIG. 6 is a block diagram depicting an exemplary implementation of a system capable of transitioning a runtime system from a controller device to a digitalization platform, according to an embodiment of the present invention.

FIG. 6 illustrates an exemplary illustration of working of a system for transitioning a runtime system from a controller device 124 to a digitalization platform 110 in a technical installation 106, according to an embodiment of the present invention.

The technical installation 106 comprises a plurality of industrial devices 108A-N and a plurality of sensor devices 126A-N which are connected to the controller device 124 and the digitalization platform 110, via the network connection 104. The controller device 124 executes an engineering program. The engineering program comprises a plurality of programming instructions, which when executed by the controller device 124, causes the controller device 124 to control the plurality of industrial devices 108A-N to run the technical installation 106 efficiently. A phase of operation of the controller device 124, in which the engineering program is being executed by the controller device 124 is called a runtime system.

In one example, the controller device 124 is configured to receive a plurality of sensor signals from the plurality of sensor devices 126A-N. Examples of the plurality of sensor signals include, but is not limited to a pressure signal, a temperature signal and a light signal. During runtime of the engineering program in the controller device 124, the controller device 124 is configured to feed the received plurality of sensor signals as input into the engineering program. The controller device 124 is further configured to generate a plurality of output signals to control the plurality of industrial devices 108A-N. The plurality of output signals are generated based on the processed plurality of sensor signals.

The processing unit 202 is configured to capture the plurality of sensor signals received by the controller device 124 from the plurality of sensor devices 126A-N. The processing unit 202 is further configured to capture the plurality of output signals transmitted by the controller device 124 to the plurality of industrial devices 108A-N.

The processing unit 202 is further configured to analyze the plurality of sensor signals and the plurality of output signals to determine a plurality of relationships between each signal in the plurality of sensor signals and the plurality of output signals. For example, the processing unit 202 is configured to determine a first set of relationships between signals in the plurality of sensor signals and a second set of relationships between signals in the plurality of output signals. The processing unit 202 is further configured to determine a third set of relationships between the plurality of sensor signals and the plurality of output signals.

The processing unit 202 is further configured to generate an input knowledge graph from the first set of relationships between signals in the plurality of sensor signals. The processing unit 202 is further configured to generate an output knowledge graph from the second set of relationships between signals in the plurality of output signals. The processing unit 202 is further configured to generate an input output correspondence knowledge graph based on the third set of relationships between the plurality of sensor signals and the plurality of output signals.

By querying the input knowledge graph, the processing unit 202 is configured to predict a sensor signal which is likely to be received by the controller device 124 in a given time interval. By querying the output knowledge graph, the processing unit 202 is enabled to predict an output signal which is likely to be transmitted by the controller device 124 in the given time interval. By querying the input output correspondence knowledge graph, the processing unit 202 is enabled to predict the output signal which is likely to be transmitted by the controller device 124 when the controller device 124 receives a specific sensor signal. The processing unit 202 is configured to combine the input knowledge graph, the output knowledge graph, and the input output correspondence knowledge graph to generate an input-output knowledge graph.

The processing unit 202 is configured to determine whether at least one connectivity error is present in the network connection 104. In a case where the at least one connectivity error is present, real time reception of the plurality of sensor signals at the controller device 124 may be interrupted. In such a scenario, the processing unit 202 is configured to query the input knowledge graph to determine a first sensor signal which is likely to be received by the controller device 124 during a time interval in which the at least one connnectivity error is present in the network connection 104. Thus, in a case where the controller device 124 is unable to receive the plurality of sensor signals from the plurality of sensor devices 126A-N, the processing unit 202 generates the first sensor signal which is likely to be received from the plurality of sensor devices 126A-N.

In a case where the at least one connectivity error is determined to be absent in the network connection 104, at least one of the controller device 124 or the processing unit

202 is configured to receive a second sensor signal from the plurality of sensor devices 126A-N.

The processing unit 202 is further configured to determine whether information about at least one of the first or the second sensor signal is present in the input-output knowledge graph. In other words, the processing unit 202 determines whether the processing unit 202 is enabled to generate an output signal corresponding to at least one of the first or the second sensor signal, by querying the input-output knowledge graph.

In a case where the information about at least one of the first or the second sensor signal is absent in the input-output knowledge graph, the processing unit 202 determines whether the information about at least one of the first or the second sensor signal is present in an external input-output knowledge graph. In one example, the external input-output knowledge graph may be stored in the database 114 which is external to the technical installation 106.

In a case where the information about at least one of the first or the second sensor signal is present in the external input-output knowledge graph, the processing unit 202 is configured to determine one or more knowledge graph instances, in the external input-output knowledge graph. The determined one or more knowledge graph instances comprises information about at least one of the first or the second sensor signal.

The processing unit 202 is further configured to modify the input-output knowledge graph by appending the one or more knowledge graph instances to the input-output knowledge graph based on a set of cognitive rules. The modification of the input-output knowledge graph is explained in detail with reference to FIG. 7 to 14.

Figure 7:
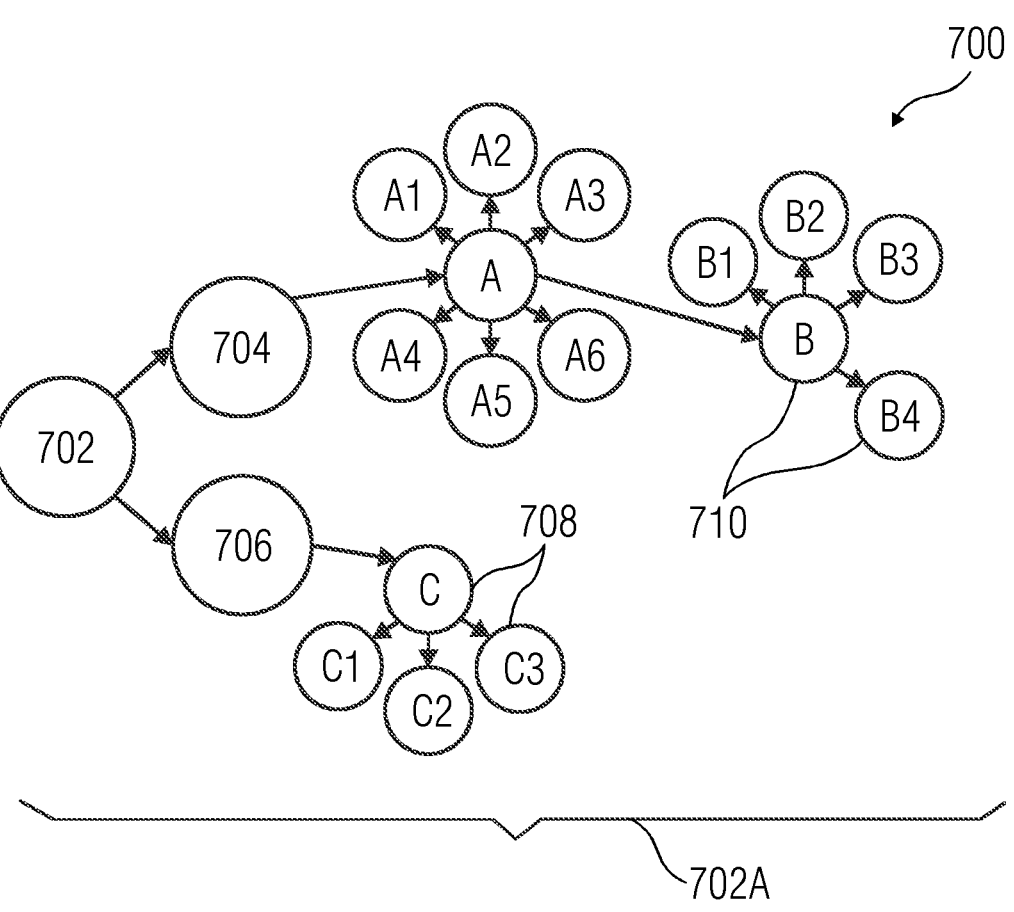
FIG. 7 is a schematic diagram illustrating an input-output knowledge graph comprising a latent section and an active section, according to an embodiment of the present invention.

To modify the input-output knowledge graph, the processing unit 202 is configured to analyze the input-output knowledge graph to determine an active section and a latent section of the input-output knowledge graph. Referring to FIG. 7, FIG. 7 illustrates the input-output knowledge graph 700. In the input-output knowledge graph comprises a plurality of nodes 702. FIG. 7 further illustrates a portion 702A of a plurality of portions of the input-output knowledge graph. The portion 702A comprises information about a first set of sensor signals of the plurality of sensor signals received by the controller device 124. The processing unit 202 is configured to classify a plurality of nodes of the portion 702A into an active section 704 and a latent section 706. The active section comprises information about one or more sensor signals which is likely to be received by the controller device 124 during execution of the engineering program. The latent section comprises information about one or more sensor signals which is not likely to be received during the execution of the engineering program by the controller device 124. The active section 704 comprises a first set of nodes 710. The latent section 706 comprises a second set of nodes 708.

In another example, the active section 704 comprises information associated with sensor signals which are currently required by the controller device 124 to smoothly execute the engineering program and run the technical installation 106 efficiently. The latent section 706 comprises information associated with sensor signals which are required by the controller device 124 at a later point in time to smoothly execute the engineering program and run the technical installation 106 efficiently.

Figure 8:
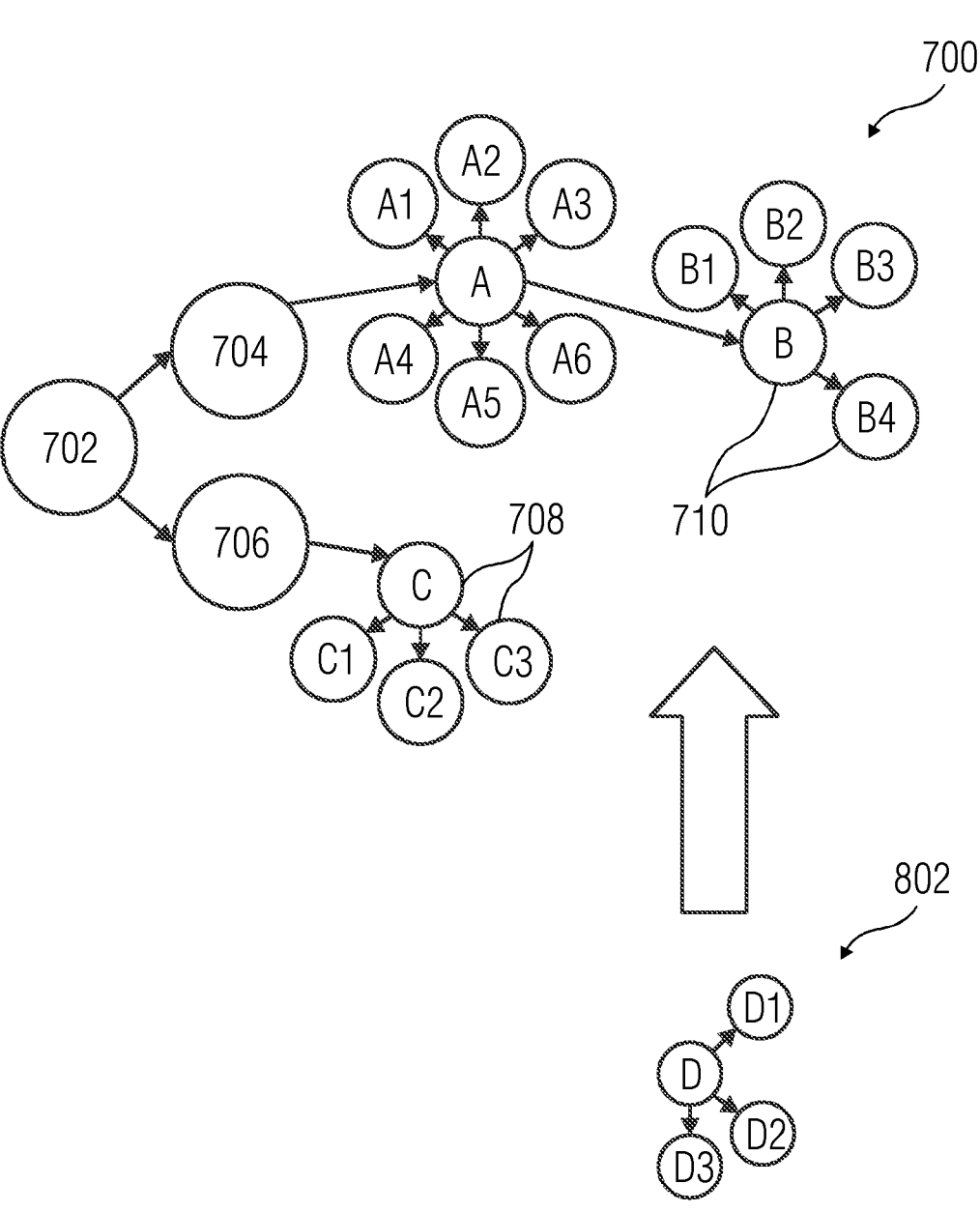
FIG. 8 is a schematic diagram illustrating a method of modifying an input-output knowledge graph, according to an embodiment of the present invention.
Figure 9:
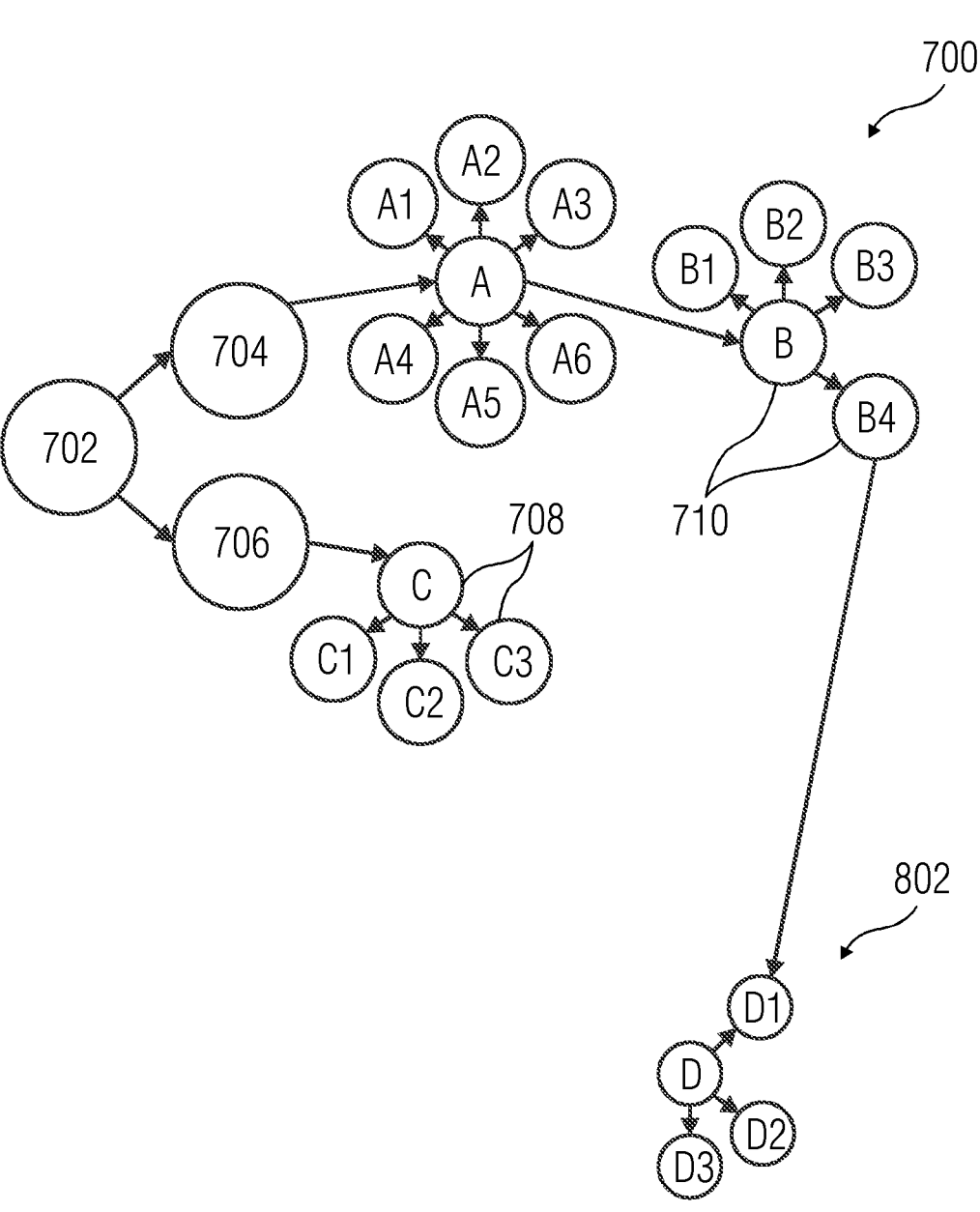
FIG. 9 is a schematic diagram illustrating a method of modifying an input-output knowledge graph using a first cognitive rule, according to an embodiment of the present invention.

Referring to FIG. 8, FIG. 8 illustrates a knowledge graph instance 802 from the external input-output knowledge graph added into the input-output knowledge graph 700. Referring to FIG. 9, FIG. 9 illustrates the knowledge graph instance 802 being appended into the input-output knowledge graph 700 based on the set of cognitive rules. Examples of the set of cognitive rules includes, but is not limited to a "learn immediately" rule, an "always learn rule", and a "forget to learn" rule.

Referring to FIG. 9, the FIG. 9 illustrates the knowledge graph instance 802 being appended to the input-output knowledge graph 700 based on the "learn immediately rule" of the set of cognitive rules.

In accordance with the "learn immediately rule", the one or more knowledge graph instances 802 are appended to the active section 704 of the input-output knowledge graph. Thus, information about at least one of the first sensor signal and the second sensor signal are appended and included in the input-output knowledge graph 700.

Referring back to FIG. 6, the input-output knowledge graph is modified to include information which is derived from the external input-output knowledge graph. Thus, the digitalization platform 110 not only learns from the plurality of sensor signals received by the controller device 124, but also from knowledge graphs stored in external databases.

The processing unit 202 is further configured to query the modified input-output knowledge graph to generate an output signal based on at least one of the first sensor signal or the second sensor signal. The processing unit 202 is further configured to transmit the generated output signal to the plurality of industrial devices 108A-N, to control the plurality of industrial devices 108A-N. Thus, the digitalization platform 110 is configured to generate output signals for all sensor signals which are covered in the input-output knowledge graph 700 and the external input-output knowledge graph.

In a case where the information about at least one of the first or the second sensor signal is present in the external input-output knowledge graph, the processing unit 202 is configured to transmit at least the first or the second sensor signal to the controller device 124 for processing. The controller device 124 is configured to generate the output signal. The processing unit 202 is further configured to transmit the generated output signal to the plurality of industrial devices 108A-N, to control the plurality of industrial devices 108A-N. Furthermore, the output signal generated by the controller device 124 is analyzed by the processing unit 202. Furthermore, the input-output knowledge graph is modified based on the analysis.

Thus, the input-output knowledge graph is modified to include information about the first or the second sensor signal, and the output signal. Thus, in a case where information about the first or the second sensor signal is absent in the input-output knowledge graph or the external input-output knowledge graph, the processing unit 202 is configured to modify the input-output knowledge graph to include information about the first or the second sensor signal.

Thus, eventually, the input-output knowledge graph accumulates information about all possible combinations of the plurality of sensor signals which is likely to be received by the controller device 124. As a result, the runtime of the engineering program is completely transitioned from the controller device 124 to the digitalization platform 110.

Figure 10:
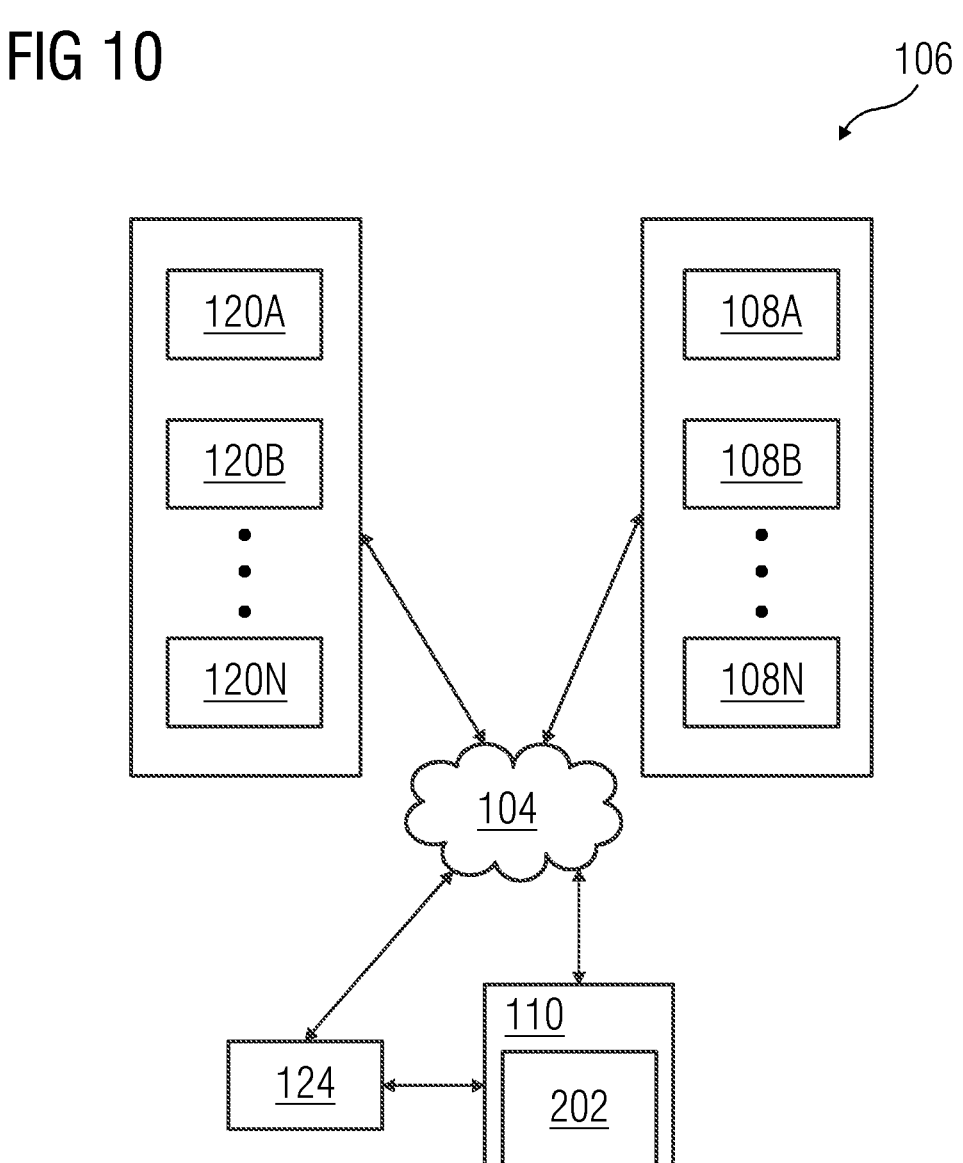
FIG. 10 is a block diagram depicting an exemplary implementation of a system capable of transitioning a runtime system from a controller device to a digitalization platform, according to an embodiment of the present invention, according to an embodiment of the present invention.

FIG. 10 illustrates an exemplary illustration of working of a system for transitioning a runtime system from a controller device 124 to a digitalization platform 110 in a technical installation 106, according to an embodiment of the present invention.

The technical installation 106 comprises a plurality of industrial devices 108A-N and a plurality of human machine interfaces (HMI) 120A-N which are connected to the controller device 124 and the digitalization platform 110, via the network connection 104. The controller device 124 executes an engineering program. The engineering program comprises a plurality of programming instructions, which when executed by the controller device 124, causes the controller device to control the plurality of industrial devices 108A-N to run the technical installation 106 efficiently. The controller device 124 is configured to receive a plurality of user inputs from a user via the plurality of hmis 120A-N. The plurality of user inputs comprises user commands, user gestures, and other forms of user inputs.

In one example, the plurality of user inputs comprises a set of programming instructions. In such a scenario, the plurality of programing instructions in the engineering program is replaced with the set of programming instructions received from the user.

In another example, the plurality of user inputs comprises a first set of user actions, performed by the user, on the plurlaity of hmis 120A-N, to control the plurality of industrial devices 108A-N.

The controller device 124 is further configured to generate a plurality of output signals to control the plurality of industrial devices 108A-N. The plurality of output signals are generated based on the processed plurality of user inputs.

The processing unit 202 is configured to capture the plurality of user inputs received by the controller device 124 from the plurality of hmis 120A-N. The processing unit 202 is further configured to capture the plurality of output signals transmitted by the controller device 124 to the plurality of industrial devices 108A-N, based on the reception of the plurality of user inputs at the controller device 124.

The processing unit 202 is further configured to analyze the plurality of user inputs and the plurality of output signals to determine a plurality of relationships between each of the plurality of user inputs and the plurality of output signals. For example, the processing unit 202 is configured to determine a first set of relationships between the plurality of user inputs and a second set of relationships between the plurality of output signals. The processing unit 202 is further configured to determine a third set of relationships between the plurality of user inputs and the plurality of output signals.

The processing unit 202 is further configured to generate an input knowledge graph from the first set of relationships between the plurality of user inputs. The processing unit 202 is further configured to generate an output knowledge graph from the second set of relationships between signals in the plurality of output signals. The processing unit 202 is further configured to generate an input output correspondence knowledge graph based on the third set of relationships between the plurality of user inputs and the plurality of output signals.

By querying the input knowledge graph, the processing unit 202 is enabled to predict a user input which is likely to be received by the controller device 124 in a given time interval. By querying the output knowledge graph, the processing unit 202 is enabled to predict an output signal which is likely to be transmitted by the controller device 124 in the given time interval. By querying the input output correspondence knowledge graph, the processing unit 202 is enabled to predict the output signal which is likely to be transmitted by the controller device 124 when the controller device 124 receives a specific user input. The processing unit 202 is configured to combine the input knowledge graph, the output knowledge graph, and the input output correspondence knowledge graph to generate an input-output knowledge graph.

The processing unit 202 is configured to determine whether at least one connectivity error is present in the network connection 104. In a case where the at least one connectivity error is present, real time reception of the plurality of user inputs at the controller device 124 may be interrupted. In such a scenario, the processing unit 202 is configured to query the input knowledge graph to determine a first user input which is likely to be received by the controller device 124 during a time interval in which the at least one connnectivity error is present in the network connection 104. Thus, in a case where the controller device 124 is unable to receive the plurality of user inputs from the plurality of human machine interfaces 120A-N, the processing unit 202 generates the first user input which is likely to be received from the plurality of hmis 120A-N.

In a case where the at least one connectivity error is determined to be absent in the network connection 104, at least one of the controller device 124 or the processing unit 202 is configured to receive a second user input from the plurality of hmis 120A-N.

The processing unit 202 is further configured to determine whether information about at least one of the first or the second user input is present in the input-output knowledge graph. In other words, the processing unit 202 determines whether the processing unit 202 is enabled to generate an output signal corresponding to at least one of the first or the second user input, by querying the input-output knowledge graph.

In a case where the information about at least one of the first or the second user input is absent in the input-output knowledge graph, the processing unit 202 determines whether the information about at least one of the first or the second user input is present in an external input-output knowledge graph. In one example, the external input-output knowledge graph may be stored in a database which is external to the technical installation 106.

In a case where the information about at least one of the first or the second user input is present in the external input-output knowledge graph, the processing unit 202 is configured to determine one or more knowledge graph instances, in the external input-output knowledge graph. The determined one or more knowledge graph instances comprises information about at least one of the first or the second user input.

The processing unit 202 is further configured to modify the input-output knowledge graph by appending the one or more knowledge graph instances to the input-output knowledge graph based on a set of cognitive rules. Thus, the modified input-output knowledge graph comprises information about a plurality of relationships of the first and the second user input, with the captured plurality of user inputs and the captured plurality of output signals. The modification of the input-output knowledge graph is explained in detail with reference to FIG. 11 to 14.

To modify the input-output knowledge graph, the processing unit 202 is configured to analyze the input-output knowledge graph 700 to determine the active section 704 and the latent section 706 of the input-output knowledge graph 700.

In a case where the plurality of user inputs are programming instructions entered by the user, the active section comprises information which is required by the controller device 124 to execute one or more tasks using the engineering program. The latent section comprises information which is required by the controller device 124 at a later point in time during the execution of the controller device 124.

Figure 11:
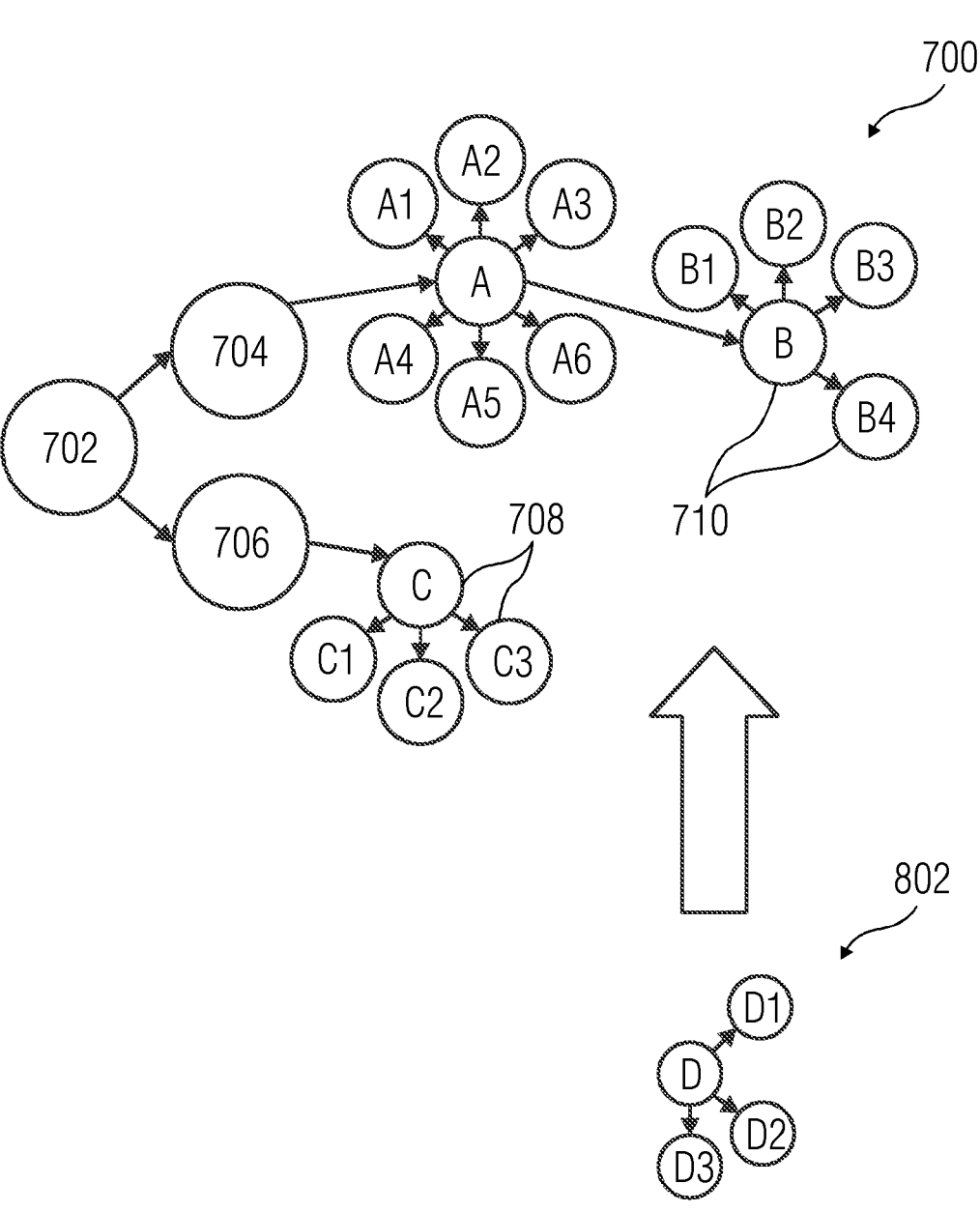
FIG. 11 is a schematic diagram illustrating a method of modifying an input-output knowledge graph, according to an embodiment of the present invention.
Figure 12:
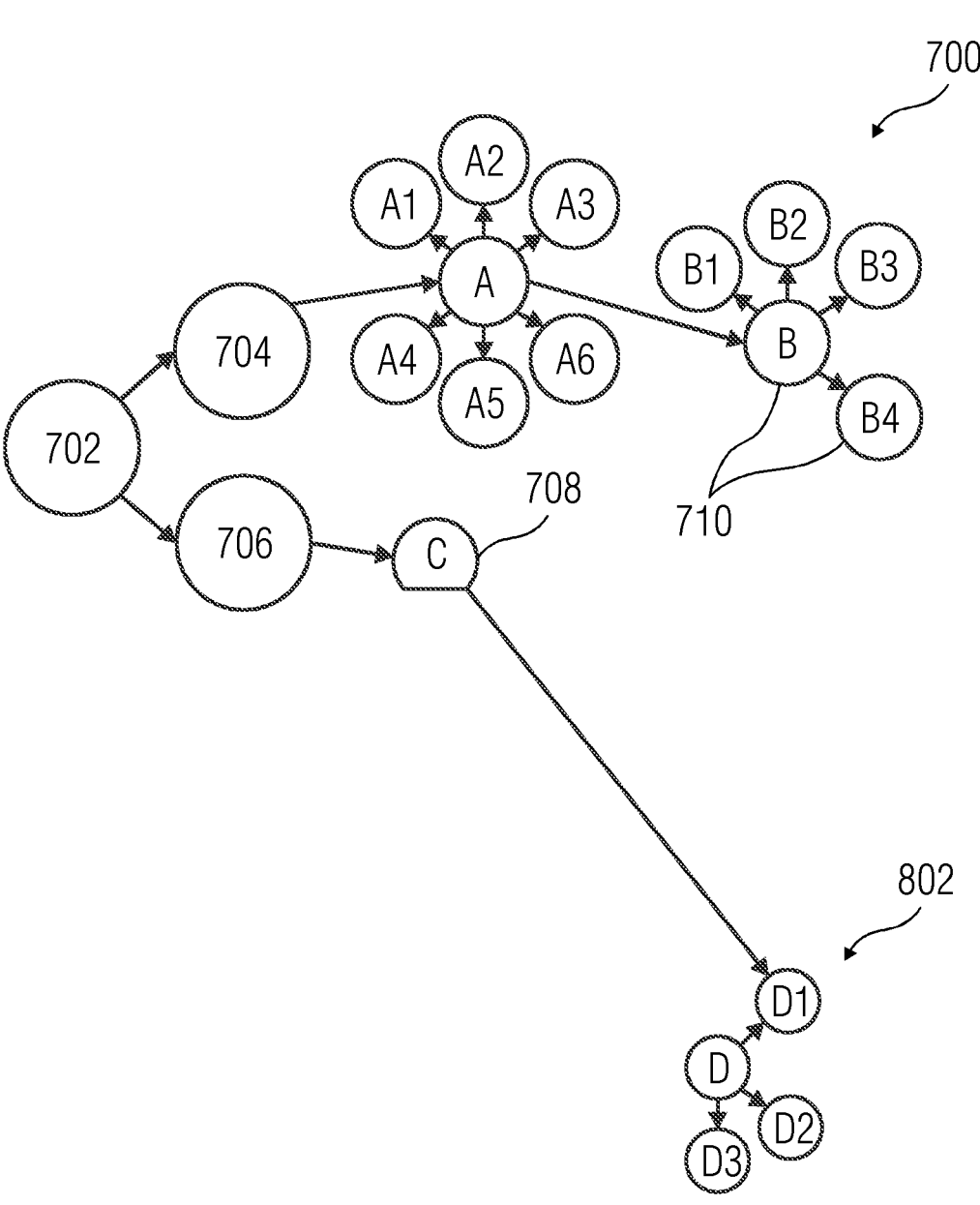
FIG. 12 is a schematic diagram illustrating a method of modifying an input-output knowledge graph using a second cognitive rule, according to an embodiment of the present invention.

Referring to FIG. 11, FIG. 11 illustrates a knowledge graph instance 802 from the external input-output knowledge graph added into the input-output knowledge graph 700. Referring to FIG. 12, FIG. 12 illustrates the knowledge graph instance 802 being appended into the input-output knowledge graph 700 based on the set of cognitive rules.

Referring to FIG. 12, the FIG. 12 illustrates the knowledge graph instance 802 being appended to the input-output knowledge graph 700 based on the "forget to learn" rule of the set of cognitive rules.

In accordance with the "forget to learn" rule, a set of nodes (C1, C2, and C3) are first removed from the input-output knowledge graph 700. Furthermore, the one or more knowledge instances 802 are appended in place of the set of nodes (C1, C2, and C3). Thus, information about at least one of the first user input and the second user input are appended and included in the input-output knowledge graph 700.

Figure 13:
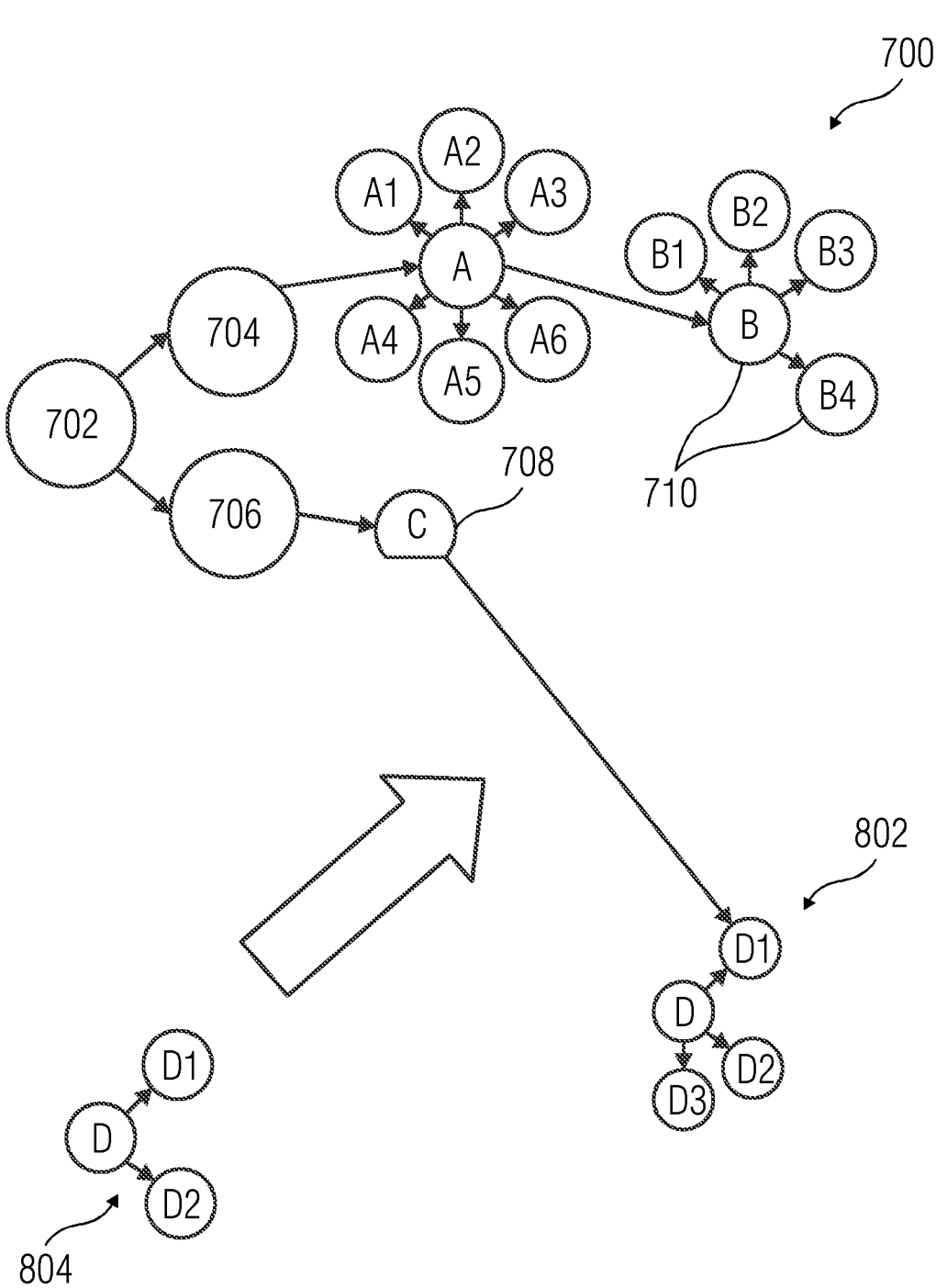
FIG. 13 is a schematic diagram illustrating a method of modifying an input-output knowledge graph using a third cognitive rule, according to an embodiment of the present invention.

Referring to FIG. 13, FIG. 13 illustrates an additional knowledge graph instance 804 from the external input-output knowledge graph added into the modified input-output knowledge graph 700. The additional knowledge graph 804 comprises further information about the first user input and the second user input.

Figure 14:
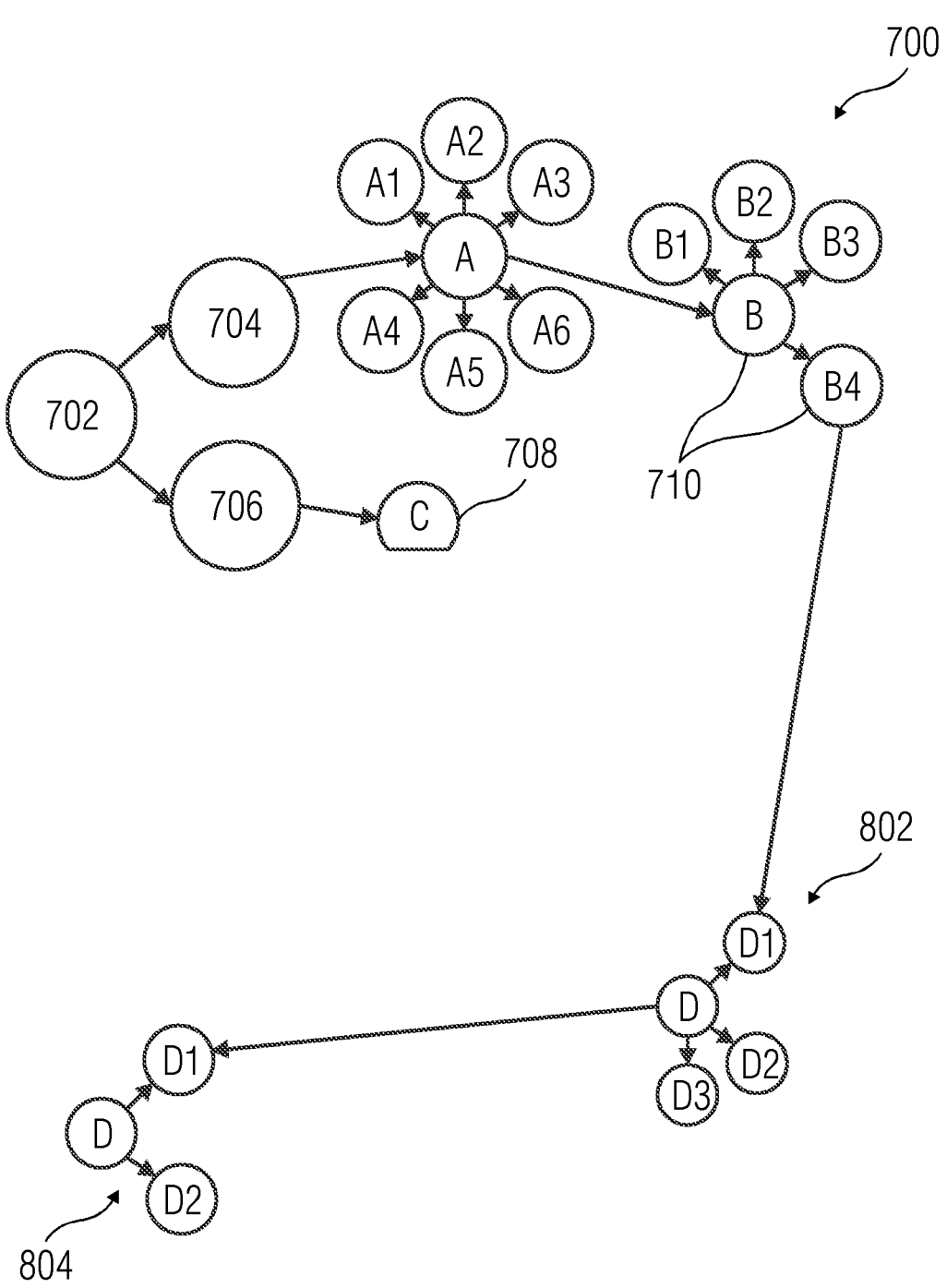
FIG. 14 is a schematic diagram illustrating a method of modifying an input-output knowledge graph using a fourth cognitive rule, according to an embodiment of the present invention.

Referring to FIG. 14, FIG. 14 illustrates the knowledge graph instance 802 being appended into the input-output knowledge graph 700 based on the set of cognitive rules.

25 Referring to FIG. 14, the FIG. 14 illustrates the knowledge graph instance 802 being appended to the input-output knowledge graph 700 based on the "learn later" rule of the set of cognitive rules.

In accordance with the "learn later" rule, the one or more knowledge graph instancea 802 are first moved from the latent section 706 to the active section 704 of the input-output knowledge graph 700. Furthermore, the additional one or more knowledge instances 804 are appended to the one or more knowledge graph instances 802 of the input-output knowledge graph 700.

Referring back to FIG. 10, the input-output knowledge graph is modified to include information which is derived from the external input-output knowledge graph. Thus, the digitalization platform 110 not only learns from the plurality of user input received by the controller device 124, but also from the one or more knowledge graphs stored in external databases.

The processing unit 202 is further configured to query the modified input-output knowledge graph to generate an output signal based on at least one of the first user input or the second user input. The processing unit 202 is further configured to transmit the generated output signal to the plurality of industrial devices 108A-N, to control the plurality of industrial devices 108A-N. Thus, the digitalization platform 110 is configured to generate output signals for all user input which are covered in the input-output knowledge graph 700 and the external input-output knowledge graph.

In a case where the information about at least one of the first or the second user input is absent in the external input-output knowledge graph, the processing unit 202 is configured to transmit at least the first or the second sensor signal to the controller device 124 for processing. The controller device 124 is configured to generate the output signal. The processing unit 202 is further configured to transmit the generated output signal to the plurality of industrial devices 108A-N, to control the plurality of industrial devices 108A-N. Furthermore, the output signal generated by the controller device 124 is analyzed by the processing unit 202. Furthermore, the input-output knowledge graph is modified based on the analysis.

Thus, the input-output knowledge graph is modified to include information about the first or the second sensor signal, and the output signal. Thus, in a case where information about the first or the second user input is absent in the input-output knowledge graph or the external input-output knowledge graph, the processing unit 202 is configured to modify the input-output knowledge graph to include information about the first or the second user input.

Thus, eventually, the input-output knowledge graph accumulates information about all possible combinations of the plurality of user inputs which is likely to be received by the controller device 124. As a result, the runtime of the engineering program is completely transitioned from the controller device 124 to the digitalization platform 110.

Embodiments of the present invention can take a form of a computer program product (non-transitory computer readable storage medium having instructions, which when executed by a processor, perform actions) comprising program modules accessible from computer-usable or computer-readable medium storing program code for use by or in connection with one or more computers, processors, or instruction execution system. For the purpose of this description, a computer-usable or computer-readable medium can be any apparatus that can contain, store, communicate, propagate, or transport the program for use by or in connection with the instruction execution system, apparatus, or device. The medium can be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processors and program code for implementing each aspect of the technology can be centralized or distributed (or a combination thereof) as known to those skilled in the conventional art.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of seamless transition of a runtime system from a controller device to a digitalization platform, the method comprising:

capturing, by a processing unit, a plurality of input-output parameter values which are transmitted or received by the controller device during an execution of an engineering program;

generating, by the processing unit, an input-output knowledge graph comprising information about a plurality of relationships between parameter values in the captured plurality of input-output parameter values;

determining, by the processing unit, whether at least one connectivity error is present in a network connection between a plurality of sensor devices and one of the controller device or the digitalization platform;

simulating, by the processing unit, when the connectivity error is determined to present, a first input parameter value based on an analysis of the generated input-output knowledge graph, wherein the first input parameter value is a parameter value to be received by the controller device, from the plurality of sensor devices during execution of the engineering program;

generating, by the processing unit, at least one output parameter value from one of the simulated first input parameter value or a second input parameter value received from a plurality of sensor devices; and transmitting, by the processing unit, the generated at least one output parameter value to a plurality of industrial devices in the technical installation, to control the plurality of industrial devices.

2. The method according to claim 1, further comprising:

determining, by the processing unit, a relationship between the at least one output parameter value and the plurality of input-output parameter values; and modifying, by the processing unit, the input-output knowledge graph based on the at least one output parameter value based on the determined relationship.

3. The method according to claim 2, wherein generating the at least one output parameter value comprises:

determining, by the processing unit, whether information about one of the first input parameter value or the second input parameter value is present in the input-output knowledge graph;

generating, by the processing unit when information about one of the first input parameter value or the second input parameter value is determined to be present in the input-output knowledge graph, the at least one output parameter value in the digitalization platform based on an analysis of the input-output knowledge graph; and generating, by the processing unit when information about one of the first input parameter value or the second input parameter value is absent in the input-output knowledge graph, the at least one output parameter value in the controller device based on execution of the engineering program in the controller device.

4. The method according to claim 3, wherein generating the input-output knowledge graph comprises:

analyzing, by the processing unit, the captured plurality of input-output parameter values;

generating an input knowledge graph, an output knowledge graph and an input-output correspondence knowledge graph, wherein:

the input knowledge graph comprises information associated with a plurality of relationships between a plurality of input parameter values in the captured plurality of input-output parameter values, the output knowledge graph comprises information associated with a plurality of relationships between a plurality of output parameter values in the captured plurality of input-output parameter values, and the input-output correspondence knowledge graph comprises information associated with a plurality of relationships between the plurality of input parameter values and the plurality of output parameter values in the captured plurality of input-output parameter values; and generating, by the processing unit, the input-output knowledge graph based on the generated input knowledge graph, the output knowledge graph and the input-output correspondence knowledge graph.

5. The method according to claim 4, further comprising:

analyzing, by the processing unit, a plurality of programming blocks of the engineering program executed by the controller device;

determining, by the processing unit, a plurality of program execution parameters of the controller device, wherein the plurality of program execution parameters comprise information about internal functioning of the controller device during execution of the engineering program;

determining, by the processing unit, an efficiency of the engineering program executed the controller device based on an analysis of the plurality of program execution parameters;

transforming, by the processing unit, the plurality of programming blocks based on an application of an artificial intelligence model on the engineering program, wherein the artificial intelligence model is trained to transform the plurality of programming blocks; and moving, by the processing unit, the transformed plurality of programming blocks to the digitalization platform.

6. The method according to claim 1, wherein generating the at least one output parameter value from one of the first input parameter value or the second input parameter value comprises:

determining, by the processing unit, whether one of the first input parameter value or the second input parameter value is a critical data item, wherein one of the first input parameter value or the second input parameter value is determined to be the critical data item based on an application of the artificial intelligence model on the first input parameter value or the second input parameter value; and generating, by the processing unit the at least one output parameter value in the controller device based on execution of the engineering program in the controller device.

7. The method according to claim 1, wherein determining whether at least one connectivity error is present in the network connection comprises:

receiving, by the processing unit, a plurality of network connection parameters associated with the network connection between the plurality of sensor devices and one of the controller device or the digitalization platform;

analyzing, by the processing unit, the plurality of network connection parameters; and determining, by the processing unit, whether the at least one connectivity error is present in the network connection based on the analysis.

8. A method of seamless transition of a runtime system from a controller device to a digitalization platform, the method comprising:

receiving, by the processing unit, a first input-output knowledge graph comprising information about a plurality of relationships between a plurality of input-output parameter values which are transmitted or received by a controller device;

receiving, by the processing unit, one or more knowledge graph instances comprising information about one or more parameter values to be received by the controller device during execution of the engineering program;

modifying, by the processing unit, the first input-output knowledge graph by appending the received one or more knowledge graph instances into the first input-output knowledge graph based on a set of cognitive rules;

determining, by the processing unit, whether at least one connectivity error is present in a network connection between a plurality of human machine interfaces and one of the controller device or the digitalization platform;

simulating, by the processing unit when the connectivity error is determined to present, a first input parameter value based on an analysis of the modified input-output knowledge graph, wherein the first input parameter value is a parameter value to be received from the plurality of human machine interfaces during execution of the engineering program;

generating, by the processing unit, at least one output parameter value from the simulated first input parameter value; and transmitting, by the processing unit, the generated at least one output parameter value to a plurality of industrial devices in the technical installation, to control the plurality of industrial devices.

9. The method according to claim 8, wherein the plurality of input-output parameter values comprises a first set of user inputs received by the controller device via the plurality of human machine interfaces, and wherein the received one or more knowledge graph instances comprising information about the one or more user inputs to be received by the controller device during execution of the engineering program, comprises:

determining, by the processing unit, a first workflow comprising the first set of user inputs, wherein information associated with the first workflow is present in the first input-output knowledge graph;

receiving, by the processing unit, a second workflow comprising a second set of user inputs, wherein information associated with the second workflow is present in a second input-output knowledge graph;

comparing, by the processing unit, the first input-output knowledge graph with the second input-output knowledge graph;

determining, by the processing unit, a process efficiency of the first workflow and the second workflow based on the comparison, wherein the process efficiency of each of the first and second workflows is an indicator of efficiency with which a respective workflow completes an engineering task using the engineering program;

determining, by the processing unit, whether the process efficiency of the second workflow is greater than the process efficiency of the first workflow; and receiving, by the processing unit, when the process efficiency of the second workflow is determined to be greater, the one or more knowledge graph instances from the second input-output knowledge graph.

10. The method according to claim 8, wherein receiving the one or more knowledge graph instances comprises:

receiving, by the processing unit, when the connectivity error is determined to absent, a second input parameter value from the plurality of human machine interfaces;

determining, by the processing unit, whether information about one of the first input parameter value or the second input parameter value is present in the first input-output knowledge graph;

receiving, by the processing unit, when the information about one of the first input parameter value or the second input parameter value is determined to be absent in the first input-output knowledge graph, a second input-output knowledge graph, wherein the second input-output knowledge graph comprises information about one of the first input parameter value or the second input parameter value;

determining, by the processing unit, the one or more knowledge graph instances within the second input-output knowledge graph, which comprises information associated with the first input parameter value or the second input parameter value;

receiving, by the processing unit, the determined one or more knowledge graph instances from the second input-output knowledge graph.

11. The method according to claim 9, wherein modifying the first input-output knowledge graph by appending the received one or more knowledge graph instances comprises:

analyzing, by the processing unit, the first input-output knowledge graph to categorize a plurality of portions of the first input-output knowledge graph into an active section and a latent section;

mapping, by the processing unit, the received one or more knowledge graph instances into one of the active section or the latent section of the first input-output knowledge graph; and modifying, by the processing unit, the received one or more knowledge graphs into the first input-output knowledge graph based on the set of cognitive rules.

12. An engineering system for seamless transition of a runtime system from a controller device to a digitalization platform, wherein the engineering system comprises:

a processing unit; and a memory coupled to the processing unit, wherein the memory comprises a data acquisition and analytics module stored in the form of machine-readable instructions executable by the one or more processor(s), wherein the data acquisition and analytics module is configured to:

capture a plurality of input-output parameter values which are transmitted or received by the controller device during an execution of an engineering program;

generate an input-output knowledge graph comprising information about a plurality of relationships between parameter values in the captured plurality of input-output parameter values;

determine whether at least one connectivity error is present in a network connection between a plurality of sensor devices and one of the controller device or the digitalization platform;

simulate when the connectivity error is determined to present, a first input parameter value based on an analysis of the generated input-output knowledge graph, wherein the first input parameter value is a parameter value to be received by the controller device, from the plurality of sensor devices during execution of the engineering program;

generate at least one output parameter value from one of the simulated first input parameter value or a second input parameter value received from a plurality of sensor devices; and transmit the generated at least one output parameter value to a plurality of industrial devices in the technical installation, to control the plurality of industrial devices.

13. A computer-program product, having machine-readable instructions stored therein, that when executed by a processing unit, cause the processors to perform a method comprising:

capturing, by a processing unit, a plurality of input-output parameter values which are transmitted or received by the controller device during an execution of an engineering program;

generating, by the processing unit, an input-output knowledge graph comprising information about a plurality of relationships between parameter values in the captured plurality of input-output parameter values;

determining, by the processing unit, whether at least one connectivity error is present in a network connection between a plurality of sensor devices and one of the controller device or the digitalization platform;

simulating, by the processing unit, when the connectivity error is determined to present, a first input parameter value based on an analysis of the generated input-output knowledge graph, wherein the first input parameter value is a parameter value to be received by the controller device, from the plurality of sensor devices during execution of the engineering program;

generating, by the processing unit, at least one output parameter value from one of the simulated first input parameter value or a second input parameter value received from a plurality of sensor devices; and transmitting, by the processing unit, the generated at least one output parameter value to a plurality of industrial devices in the technical installation, to control the plurality of industrial devices.

* * * * *